United States Patent
Kao et al.

(10) Patent No.: US 11,451,576 B2
(45) Date of Patent: *Sep. 20, 2022

(54) INVESTIGATION OF THREATS USING QUERYABLE RECORDS OF BEHAVIOR

(71) Applicant: Abnormal Security Corporation, San Francisco, CA (US)

(72) Inventors: Jeremy Kao, Corona, CA (US); Kai Jing Jiang, San Francisco, CA (US); Sanjay Jeyakumar, Berkeley, CA (US); Yea So Jung, San Mateo, CA (US); Carlos Daniel Gasperi, New York, NY (US); Justin Anthony Young, New York, NY (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,459

(22) Filed: Mar. 12, 2021

(65) Prior Publication Data

US 2021/0288990 A1   Sep. 16, 2021

Related U.S. Application Data

(60) Provisional application No. 62/988,728, filed on Mar. 12, 2020.

(51) Int. Cl.
    *H04L 29/06* (2006.01)
    *H04L 9/40* (2022.01)
    *H04L 67/125* (2022.01)

(52) U.S. Cl.
    CPC ...... *H04L 63/1433* (2013.01); *H04L 63/1425* (2013.01); *H04L 67/125* (2013.01)

(58) Field of Classification Search
    CPC ............ H04L 63/1433; H04L 63/1425; H04L 67/125
    See application file for complete search history.

(56) References Cited

U.S. PATENT DOCUMENTS

| | | | |
|---|---|---|---|
| 6,088,717 | A | 7/2000 | Reed |
| 7,263,506 | B2 | 8/2007 | Lee |

(Continued)

FOREIGN PATENT DOCUMENTS

CN   107315954   11/2017

OTHER PUBLICATIONS

Barngrover, Adam, "Vendor Access Management with IGA", Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.

(Continued)

*Primary Examiner* — Oleg Korsak
(74) *Attorney, Agent, or Firm* — Van Pelt, Yi & James LLP

(57) ABSTRACT

Introduced here are computer programs and computer-implemented techniques for producing records of digital activities that are performed with accounts associated with employees of enterprises. Such an approach ensures that records are created for digital activities that are deemed unsafe and for digital activities that are deemed safe by a threat detection platform. At a high level, more comprehensively recording digital activities not only provides insight into the behavior of individual accounts, but also provides insight into the holistic behavior of employees across multiple accounts. These records may be stored in a searchable datastore to enable expedient and efficient review.

46 Claims, 22 Drawing Sheets

(56) References Cited

U.S. PATENT DOCUMENTS

| | | |
|---|---|---|
| 7,451,487 B2 | 11/2008 | Oliver |
| 7,610,344 B2 | 10/2009 | Mehr |
| 7,953,814 B1 | 5/2011 | Chasin |
| 8,566,938 B1 | 10/2013 | Prakash |
| 8,819,819 B1 | 8/2014 | Johnston |
| 8,935,788 B1 | 1/2015 | Diao |
| 9,009,824 B1 | 4/2015 | Chen |
| 9,154,514 B1 | 10/2015 | Prakash |
| 9,213,827 B2* | 12/2015 | Li .................. H04L 63/1433 |
| 9,245,115 B1 | 1/2016 | Jakobsson |
| 9,264,418 B1 | 2/2016 | Crosley |
| 9,348,981 B1 | 5/2016 | Hearn |
| 9,473,437 B1 | 10/2016 | Jakobsson |
| 9,516,053 B1* | 12/2016 | Muddu .............. H04L 63/1433 |
| 9,537,880 B1 | 1/2017 | Jones |
| 9,571,512 B2* | 2/2017 | Ray .................. H04L 63/1425 |
| 9,686,308 B1 | 6/2017 | Srivastava |
| 9,756,007 B1 | 9/2017 | Stringhini |
| 9,774,626 B1 | 9/2017 | Himler |
| 9,781,152 B1 | 10/2017 | Mistratov |
| 9,847,973 B1 | 12/2017 | Jakobsson |
| 9,961,096 B1* | 5/2018 | Pierce .............. H04L 63/1425 |
| 9,967,268 B1 | 5/2018 | Hewitt |
| 10,015,182 B1* | 7/2018 | Shintre ............. H04L 63/1441 |
| 10,104,029 B1 | 10/2018 | Chambers |
| 10,129,194 B1 | 11/2018 | Jakobsson |
| 10,129,288 B1 | 11/2018 | Xie |
| 10,243,989 B1 | 3/2019 | Ding |
| 10,250,624 B2* | 4/2019 | Mixer ............... H04L 63/1425 |
| 10,277,628 B1 | 4/2019 | Jakobsson |
| 10,362,057 B1 | 7/2019 | Wu |
| 10,397,272 B1 | 8/2019 | Bruss |
| 10,419,468 B2* | 9/2019 | Glatfelter ............ G06N 20/00 |
| 10,601,865 B1 | 3/2020 | Mesdaq |
| 10,616,272 B2 | 4/2020 | Chambers |
| 10,673,880 B1* | 6/2020 | Pratt .................. G06N 20/00 |
| 10,721,195 B2 | 7/2020 | Jakobsson |
| 10,911,489 B1* | 2/2021 | Chechik ............. H04L 63/1425 |
| 11,019,076 B1 | 5/2021 | Jakobsson |
| 11,063,897 B2 | 7/2021 | Kessler |
| 11,153,351 B2 | 10/2021 | Kalinin |
| 2002/0002520 A1 | 1/2002 | Gatto |
| 2005/0187934 A1 | 8/2005 | Motsinger |
| 2006/0253581 A1 | 11/2006 | Dixon |
| 2007/0074169 A1 | 3/2007 | Chess |
| 2007/0276851 A1 | 11/2007 | Friedlander |
| 2008/0086532 A1 | 4/2008 | Cunningham |
| 2008/0114684 A1 | 5/2008 | Foster |
| 2009/0037350 A1 | 2/2009 | Rudat |
| 2009/0132490 A1 | 5/2009 | Okraglik |
| 2010/0318614 A1 | 12/2010 | Sager |
| 2011/0173142 A1 | 7/2011 | Dasgupta |
| 2012/0028606 A1 | 2/2012 | Bobotek |
| 2012/0110672 A1 | 5/2012 | Judge |
| 2012/0278887 A1 | 11/2012 | Krish |
| 2012/0290712 A1 | 11/2012 | Walter |
| 2012/0297484 A1 | 11/2012 | Srivastava |
| 2013/0041955 A1 | 2/2013 | Chasin |
| 2014/0013441 A1 | 1/2014 | Hencke |
| 2014/0032589 A1 | 1/2014 | Styler |
| 2014/0380478 A1 | 12/2014 | Canning |
| 2015/0026027 A1 | 1/2015 | Priess |
| 2015/0128274 A1 | 5/2015 | Giokas |
| 2015/0143456 A1 | 5/2015 | Raleigh |
| 2015/0161609 A1 | 6/2015 | Christner |
| 2015/0228004 A1 | 8/2015 | Bednarek |
| 2015/0234831 A1 | 8/2015 | Prasanna Kumar |
| 2015/0237068 A1 | 8/2015 | Sandke |
| 2015/0295942 A1 | 10/2015 | Tao |
| 2015/0339477 A1 | 11/2015 | Abrams |
| 2016/0014151 A1 | 1/2016 | Prakash |
| 2016/0036829 A1 | 2/2016 | Sadeh-Koniecpol |
| 2016/0057167 A1 | 2/2016 | Bach |
| 2016/0156654 A1 | 6/2016 | Chasin |
| 2016/0227367 A1 | 8/2016 | Alsehly |
| 2016/0253598 A1 | 9/2016 | Makoto |
| 2016/0262128 A1 | 9/2016 | Hailpern |
| 2016/0321243 A1 | 11/2016 | Walia |
| 2016/0328526 A1 | 11/2016 | Park |
| 2016/0344770 A1 | 11/2016 | Verma |
| 2017/0041296 A1 | 2/2017 | Ford |
| 2017/0048273 A1 | 2/2017 | Bach |
| 2017/0098219 A1 | 4/2017 | Peram |
| 2017/0111506 A1 | 4/2017 | Strong |
| 2017/0186112 A1 | 6/2017 | Polapala |
| 2017/0214701 A1 | 7/2017 | Hasan |
| 2017/0223046 A1 | 8/2017 | Singh |
| 2017/0230323 A1 | 8/2017 | Jakobsson |
| 2017/0230403 A1 | 8/2017 | Kennedy |
| 2017/0237776 A1 | 8/2017 | Higbee |
| 2017/0251006 A1 | 8/2017 | Larosa |
| 2017/0289191 A1 | 10/2017 | Thioux |
| 2017/0346853 A1 | 11/2017 | Wyatt |
| 2018/0027006 A1* | 1/2018 | Zimmermann ..... H04L 63/0245 726/11 |
| 2018/0084003 A1 | 3/2018 | Uriel |
| 2018/0084013 A1 | 3/2018 | Dalton |
| 2018/0091453 A1 | 3/2018 | Jakobsson |
| 2018/0091476 A1 | 3/2018 | Jakobsson |
| 2018/0196942 A1 | 7/2018 | Kashyap |
| 2018/0219888 A1* | 8/2018 | Apostolopoulos ......................... H04L 63/1425 |
| 2018/0227324 A1 | 8/2018 | Chambers |
| 2018/0295146 A1 | 10/2018 | Kovega |
| 2018/0324297 A1 | 11/2018 | Kent |
| 2019/0014143 A1 | 1/2019 | Syme |
| 2019/0026461 A1 | 1/2019 | Cidon |
| 2019/0028509 A1 | 1/2019 | Cidon |
| 2019/0052655 A1 | 2/2019 | Benishti |
| 2019/0065748 A1 | 2/2019 | Foster |
| 2019/0068616 A1 | 2/2019 | Woods |
| 2019/0089711 A1 | 3/2019 | Faulkner |
| 2019/0104154 A1 | 4/2019 | Kumar |
| 2019/0109863 A1 | 4/2019 | Traore |
| 2019/0141183 A1 | 5/2019 | Chandrasekaran |
| 2019/0166161 A1 | 5/2019 | Anand |
| 2019/0166162 A1 | 5/2019 | Anand |
| 2019/0199745 A1 | 6/2019 | Jakobsson |
| 2019/0205511 A1 | 7/2019 | Zhan |
| 2019/0222606 A1 | 7/2019 | Schweighauser |
| 2019/0238571 A1 | 8/2019 | Adir |
| 2019/0311121 A1 | 10/2019 | Martin et al. |
| 2019/0319905 A1 | 10/2019 | Baggett |
| 2019/0384911 A1 | 12/2019 | Caspi |
| 2020/0007502 A1 | 1/2020 | Everton |
| 2020/0021609 A1 | 1/2020 | Kuppanna |
| 2020/0044851 A1 | 2/2020 | Everson |
| 2020/0053111 A1 | 2/2020 | Jakobsson |
| 2020/0076825 A1 | 3/2020 | Vallur |
| 2020/0125725 A1 | 4/2020 | Petersen |
| 2020/0162483 A1 | 5/2020 | Farhady |
| 2020/0204572 A1* | 6/2020 | Jeyakumar ............ H04L 51/12 |
| 2020/0287936 A1 | 9/2020 | Nguyen |
| 2020/0344251 A1* | 10/2020 | Jeyakumar .......... H04L 63/1416 |
| 2020/0358804 A1* | 11/2020 | Crabtree ............... H04L 63/102 |
| 2020/0374251 A1 | 11/2020 | Warshaw |
| 2020/0389486 A1* | 12/2020 | Jeyakumar .......... H04L 63/1425 |
| 2020/0396258 A1* | 12/2020 | Jeyakumar .......... H04L 63/1416 |
| 2021/0058395 A1 | 2/2021 | Jakobsson |
| 2021/0091962 A1 | 3/2021 | Finke |
| 2021/0092154 A1 | 3/2021 | Kumar |
| 2021/0168161 A1 | 6/2021 | Dunn |
| 2021/0240836 A1 | 8/2021 | Hazony |
| 2021/0272066 A1 | 9/2021 | Bratman |
| 2021/0295179 A1 | 9/2021 | Eyal Altman |
| 2021/0329035 A1 | 10/2021 | Jeyakumar |
| 2021/0336983 A1 | 10/2021 | Lee |
| 2021/0360027 A1 | 11/2021 | Boyer |
| 2021/0374679 A1 | 12/2021 | Bratman |

(56) References Cited

U.S. PATENT DOCUMENTS

2021/0374680 A1    12/2021   Bratman
2022/0021700 A1     1/2022   Devlin

OTHER PUBLICATIONS

International Search Report and Written Opinion dated Apr. 24, 2020 of PCT/US2019/067279 (14 pages).
Mahajan, et al., "Finding HTML Presentation Failures Using Image Comparison Techniques", ASE'14, pp. 91-98 (Year: 2014).
Mont, Marco Casass A, "Towards accountable management of identity and privacy: Sticky policies and enforceable tracing services", 14th International Workshop on Database and Expert Systems Applications, 2003. Proceedings. IEEE, 2003. Mar. 19, 2003 (Mar. 19, 2003), Retrieved on Apr. 17, 2021 (Apr. 17, 2021) from <https://ieeexplore.ieee.org/abstract/documenV1232051> entire document, Mar. 19, 2003, 17 pp.

\* cited by examiner

700

701 Obtain data that is related to a series of digital activities performed with accounts on a channel that is accessible to employees of an enterprise

702 Parse the data to discover an attribute of each digital activity

703 Determine the threat posed by each digital activity based on the corresponding attribute

704 Generate a record of each digital activity by populating a data structure with (i) the corresponding attribute and (ii) an indication of the threat posed to the enterprise

705 Populate the records into digital profiles that are maintained for the accounts

706 Receive input, provided through a computer program, that is indicative of a query that specifies a criterion

707 Search the digital profiles to identify records, if any, that satisfy the query by having a given attribute that matches the criterion

708 Cause display of an interface by the computer program that specifies the matching records

| Abnormal Cases | Threat Log | Dashboard | Internal: | Customer Name (Active Mode) ⌄ | Customer Mode: ⬤ | John Doe ⌄ |

Threat log

Employee mailbox protected  All-time Attacks Found by Abnormal Security  Download spreadsheet ⓘ
2334  12343

Source: ( All Emails ⌄ )  Filter By ⊕  ( 10/13/20 19 - 11/11/20 19 ✕ )  ( Message ID: 94038ae0-91d0-467 e-B9df-262c057da32b@... ✕ )

1 of 3048 attack campaigns

| Subject | From | Campaign Recipient(s) | Received | Analysis | Remediation status |
|---|---|---|---|---|---|
| Verify Direct Deposit | Calvin Cooper<br>mbell@company.com | Arthur Cooper<br>acooper@company.com | 2 min ago<br>July 27 3:47PM PDT | | Safe |

Safe emails displayed but
clickthrough may not be available

| Subject | From | Campaign Recipient(s) | Received | Engagement | Analysis | Remediation status |
|---|---|---|---|---|---|---|
| Critical: Update your billing information <br> ⦿ Invoice Fraud | Internal <br> hr@company.com <br> ∞ Imp. VIP | Jason Terry <br> j.terry@genomicresearch.com <br> 👤 VIP | 2 min ago <br> July 27 3:47PM PDT | ✎ Replied to Attack | 👁 93  ✋ BEC (Fraud) <br> ⦿ Invoice Payment | Auto Remediated <br> 📧 Phishing mailbox  ◆ Link |
| Mail Sync Error <br> ⬇ Credential Phishing | Microsoft 0365 Company <br> mailto-32012@ <br> 719ignd3132.w2 <br> ca.gullhu9k.mf | Jason Terry <br> j.terry@genomicresearch.com <br> 👤 VIP | 2 min ago <br> July 27 3:47PM PDT | ✉ Opened Attack | 👁 43  ◆ Link <br> ✋ Extortion <br> ⦿ Billing Acct Update Fraud | Would Remediated |

Threat Log

Employee mailbox protected
2334

All-time Attacks Found by Abnormal Security
12343

Search By 🔍 (Recipient: j.terry@genomicresearch.com ✕) Filter By (2) ☰ (Source: Advanced Attacks ✕) (Attack Type: Extortion ✕)

100 of 3048 attack campaigns

| Subject | From | Campaign Recipient(s) | Received | Engagement | Analysis | Remediation status |
|---|---|---|---|---|---|---|
| Critical: Update your billing information<br>⊙ Invoice Fraud | Internal<br>hr@company.com<br>🔗 Imp.VIP | Jason Terry<br>j.terry@genomicresearch.com<br>👤 VIP | 2 min ago<br>July 27 3:47PM PDT | ✓ Replied to Attack | 📎 93<br>♂ Spoofed Email<br>⊙ Invoice Fraud<br>📬 Phishing mailbox<br>🔗 Link | Auto Remediated |

Abnormal Cases | Threat Log | Dashboard     Internal: (Customer Name (Passive Mode) ⌄)   Customer Mode: ⬤ 〇 John Doe ⌄

Download spreadsheet ⓘ

INVESTIGATION OF THREATS USING QUERYABLE RECORDS OF BEHAVIOR

CROSS-REFERENCE TO RELATED APPLICATIONS

This application claims priority to U.S. Provisional Application No. 62/988,728, titled "Threat Detection Platforms with Improved Investigative Abilities" and filed on Mar. 12, 2020, which is incorporated by reference herein in its entirety.

TECHNICAL FIELD

Various embodiments concern computer programs and associated computer-implemented techniques for profiling the behavior of accounts associated with employees of enterprises.

BACKGROUND

Email has become vastly more sophisticated with the Internet connecting millions of individuals in real time. These technological advancements have incentivized malicious actors (also referred to as "attackers") to send malicious emails in greater numbers than ever before. Because email represents the primary communication channel for most enterprises (also referred to as "businesses," "companies," or "organizations"), it is a primary point of entry for attackers.

Enterprises have traditionally employed secure email gateways (SEGs) to protect on-premises email. A SEG is an appliance—implemented via hardware, firmware, or software—that monitors incoming and outgoing emails to prevent delivery of harmful content. SEGs have historically been fairly successful in filtering spam, blocking malware, and thwarting phishing attacks. However, such an approach is largely unsuitable for examining the vast number of emails handled by collaboration suites such as Microsoft Office® 365 and Google Workspace™. Accordingly, enterprises have begun employing security operations center (SOC) analysts who use various tools that employ artificial intelligence, machine learning, or filtering mechanisms to stop sophisticated attacks.

Many enterprises have struggled to mitigate the threats posed by sophisticated attacks, however, as SOC analysts are unable to manually address the large number of threats faced on a daily basis. As an example, a mid-size enterprise with several hundred employees could experience dozens or hundreds of threats on a daily basis that must be dealt with. In short, SOC analysts lack the tools needed to review, investigate, and remediate emails in a timely, consistent, and resource-efficient manner.

BRIEF DESCRIPTION OF THE DRAWINGS

FIG. 7 includes a flow diagram of a process for generating and then employing digital profiles maintained for accounts associated with employees of an enterprise.

FIGS. 9A-B include examples of interfaces that illustrate additional features of the portal through which records can be viewed, accessed, and modified.

Figure 10A:
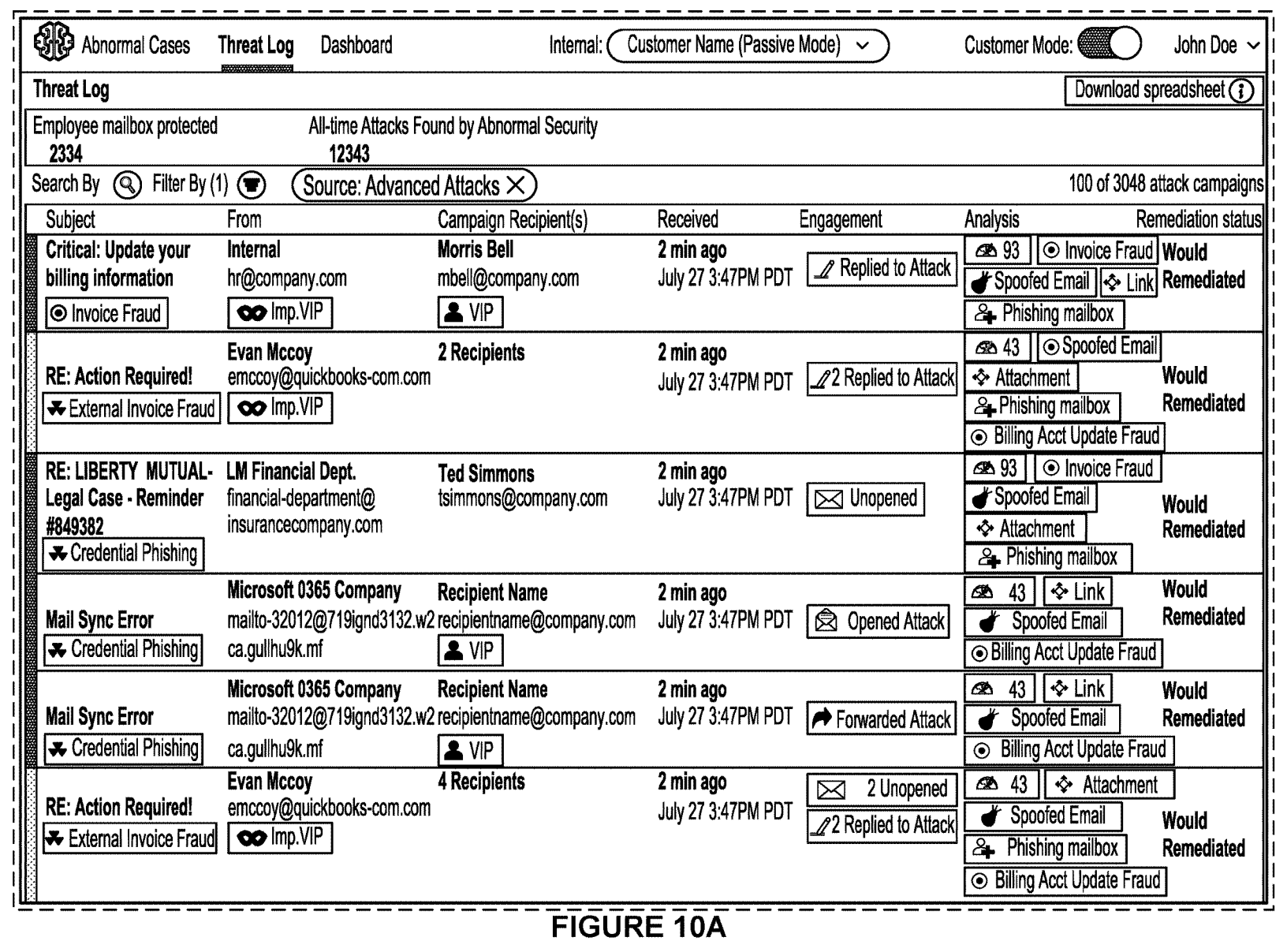
Figure 10B:
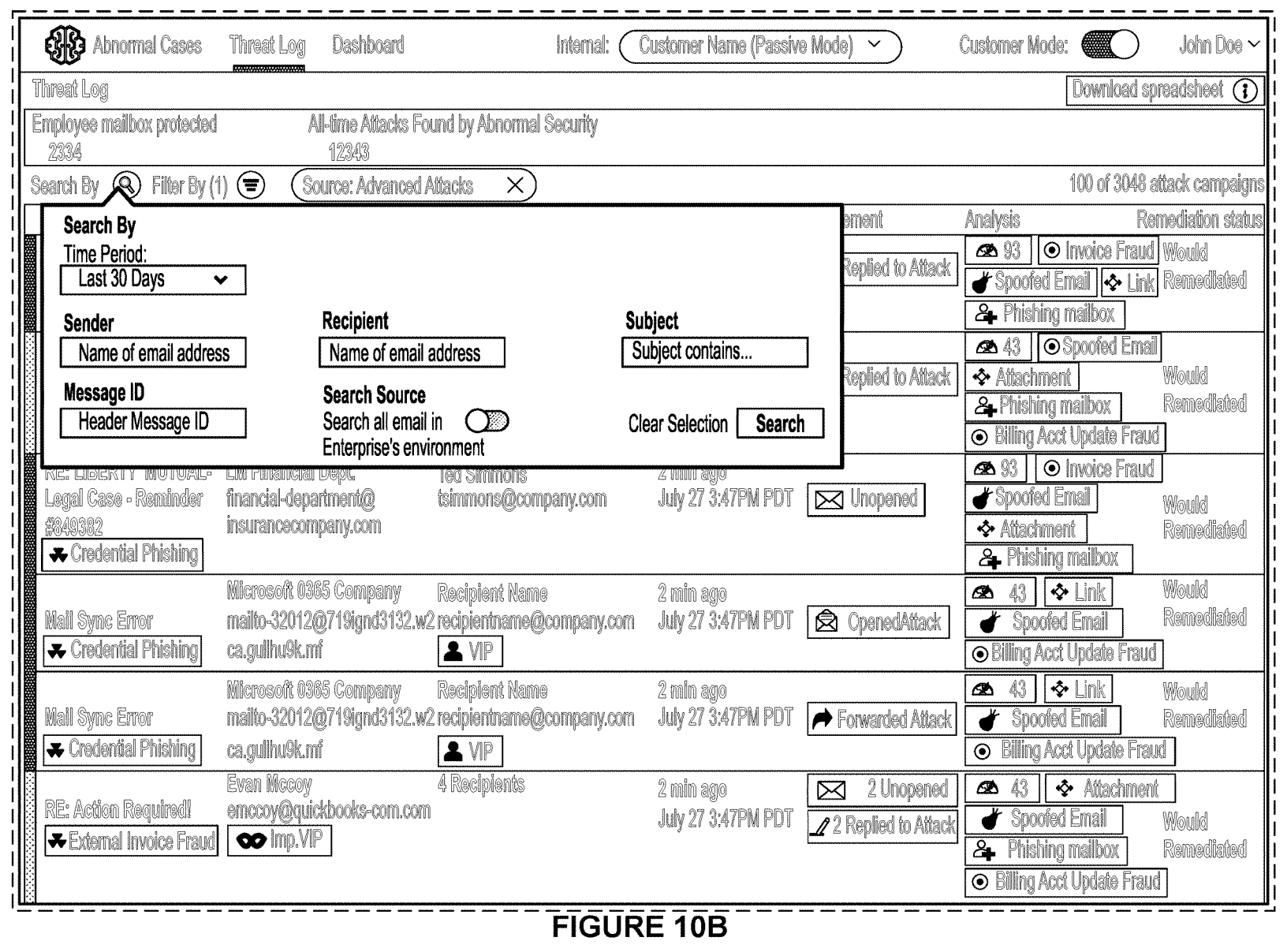
Figure 10C:
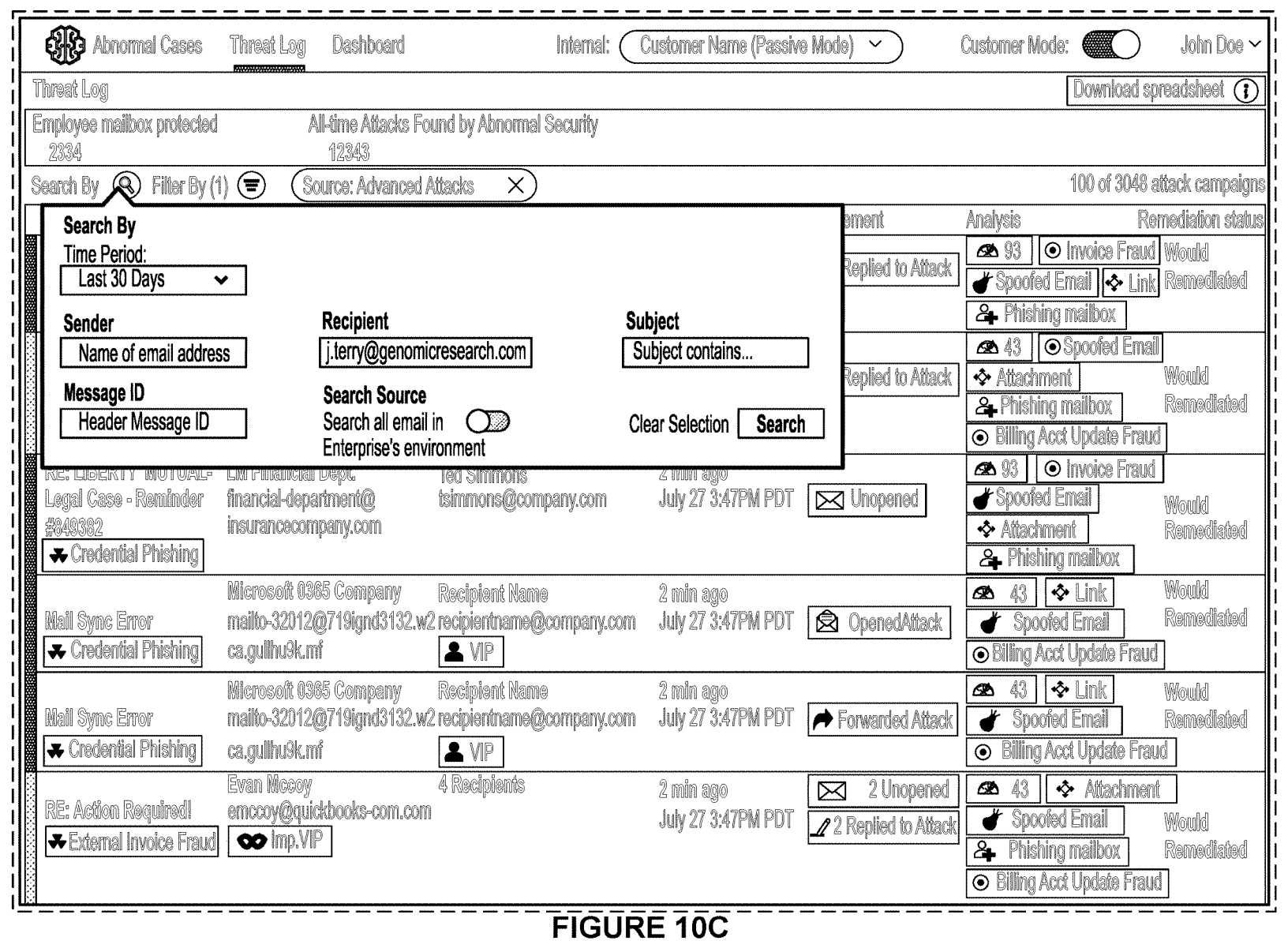
Figure 10D:
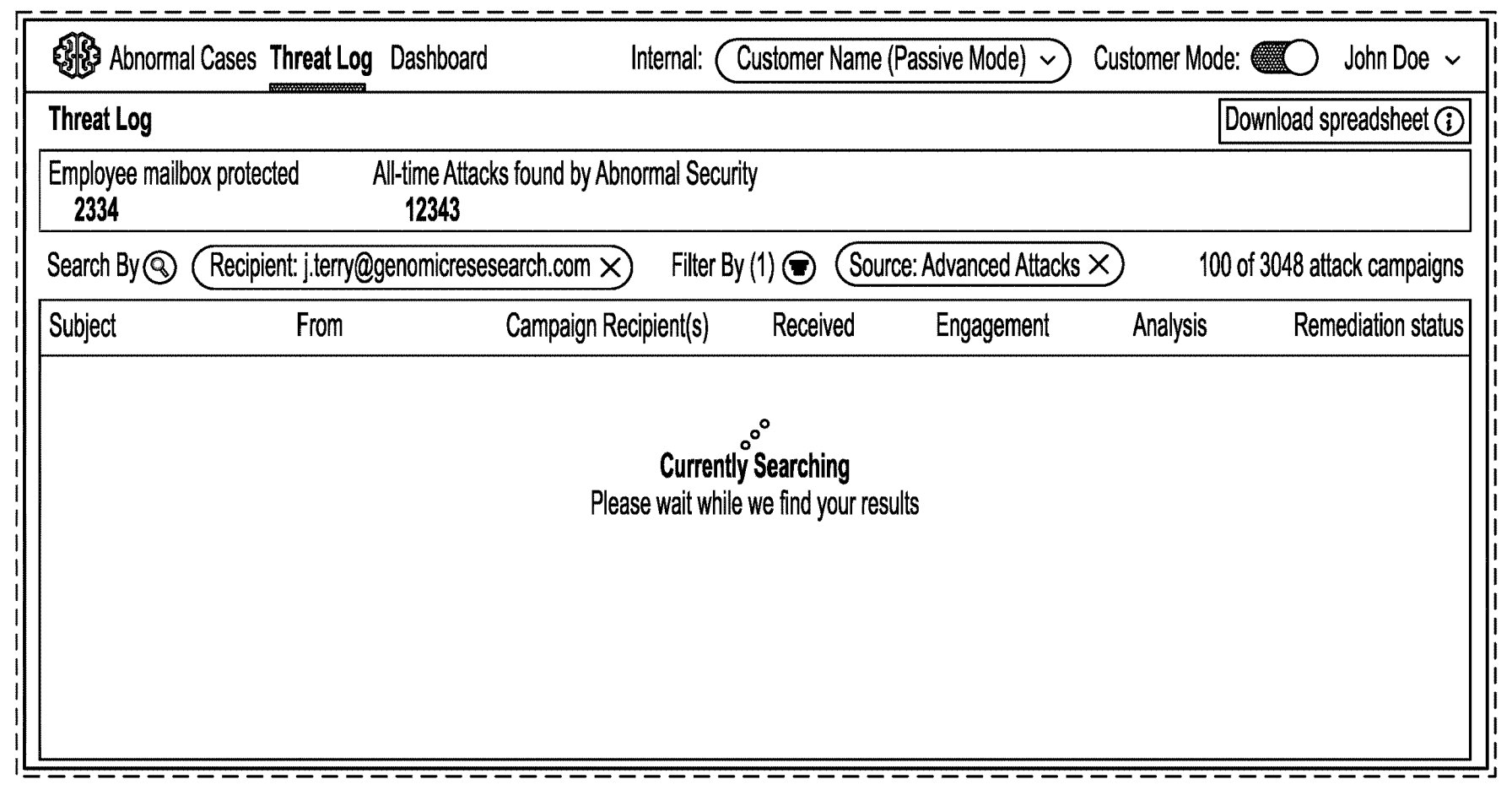
Figure 10F:
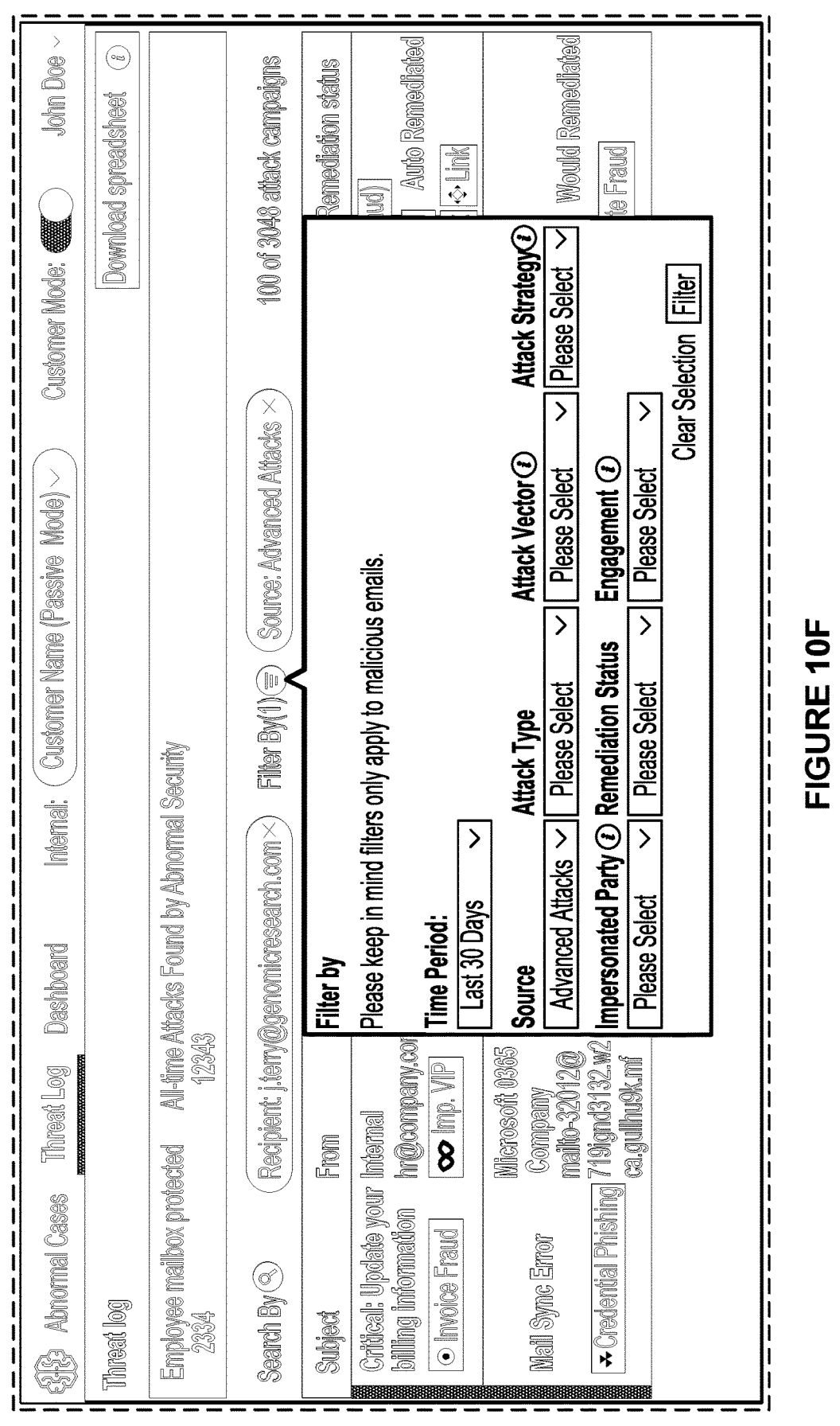
Figure 10G:
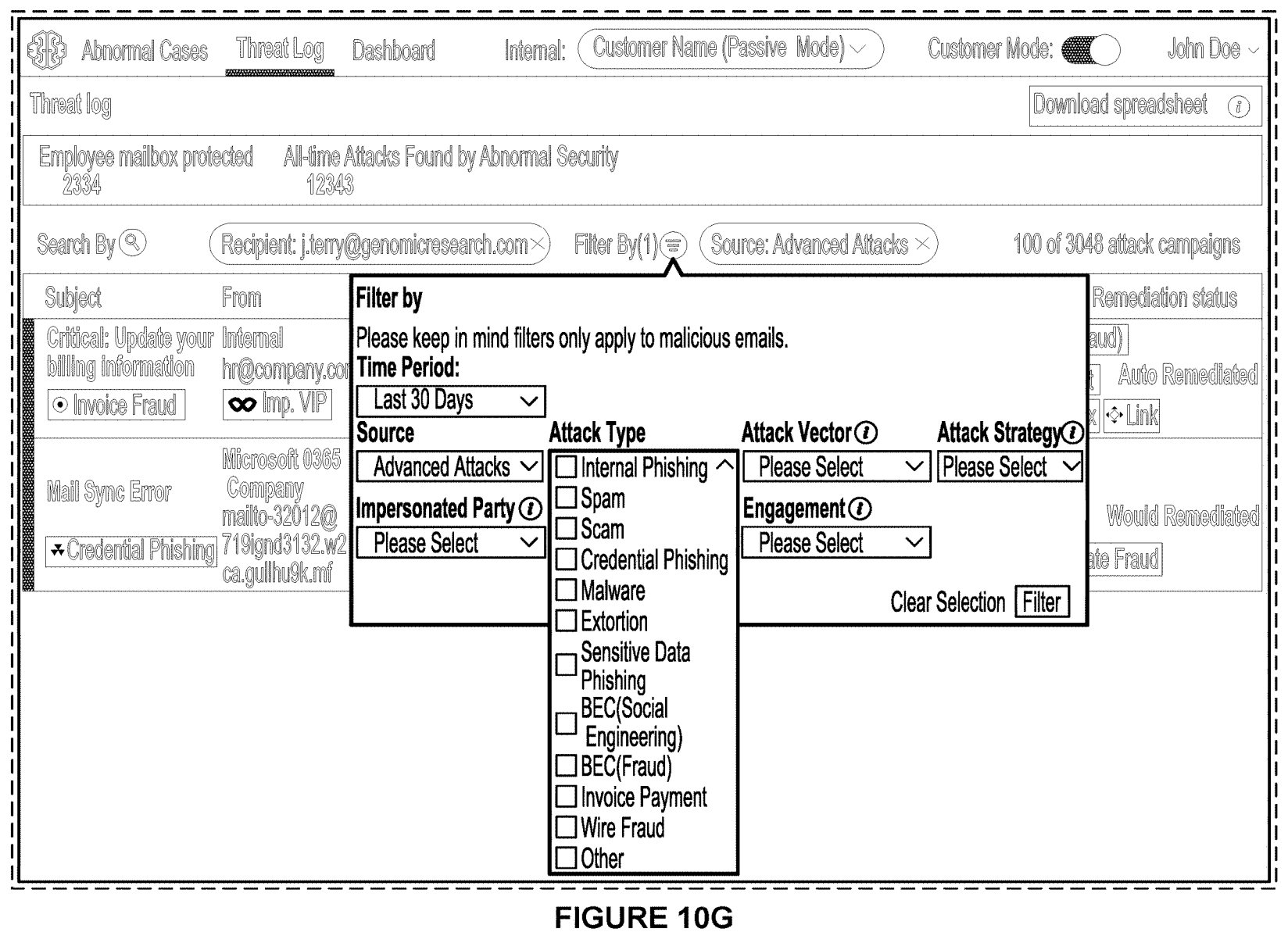
Figure 10H:
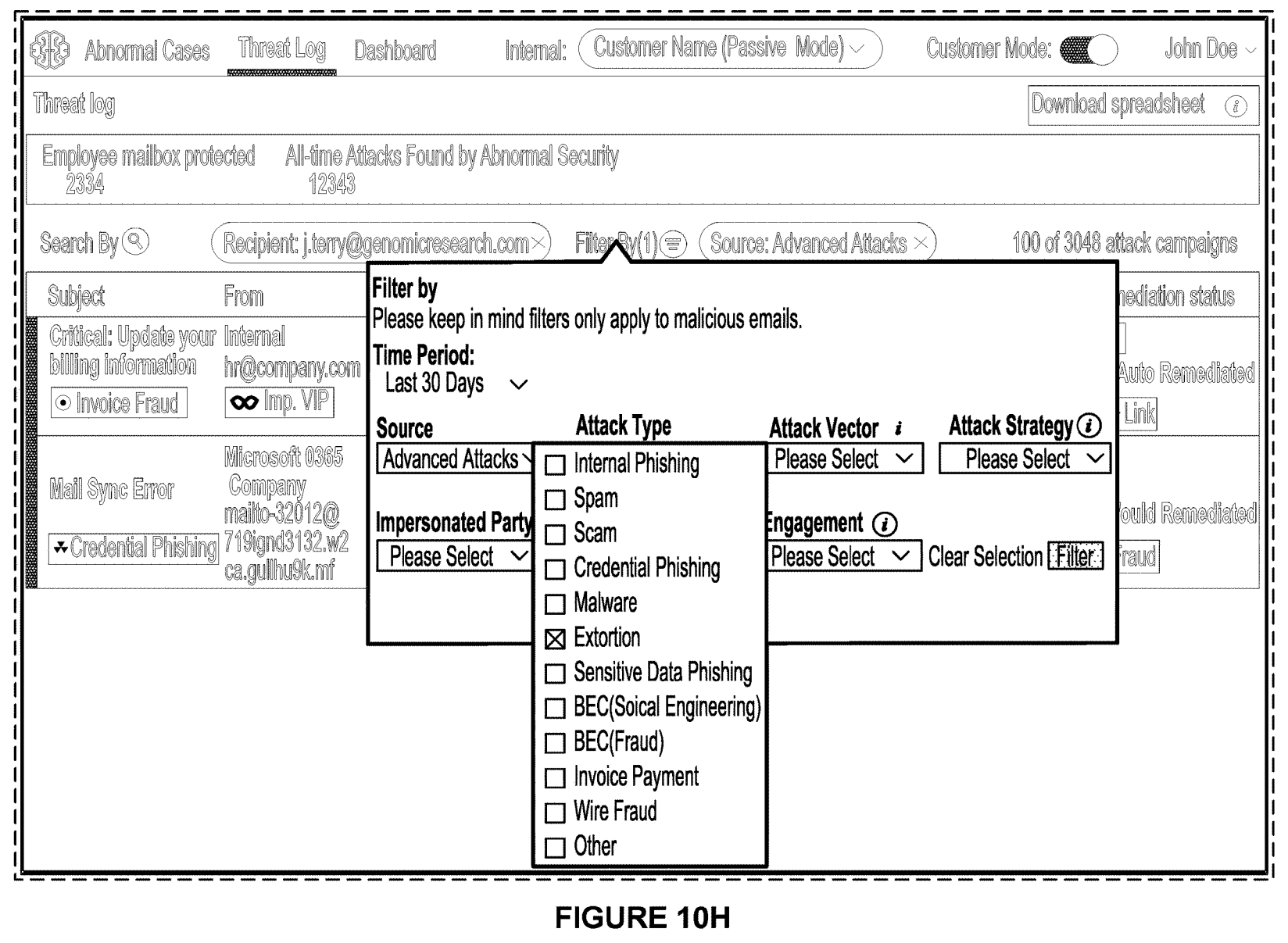
Figure 10I:
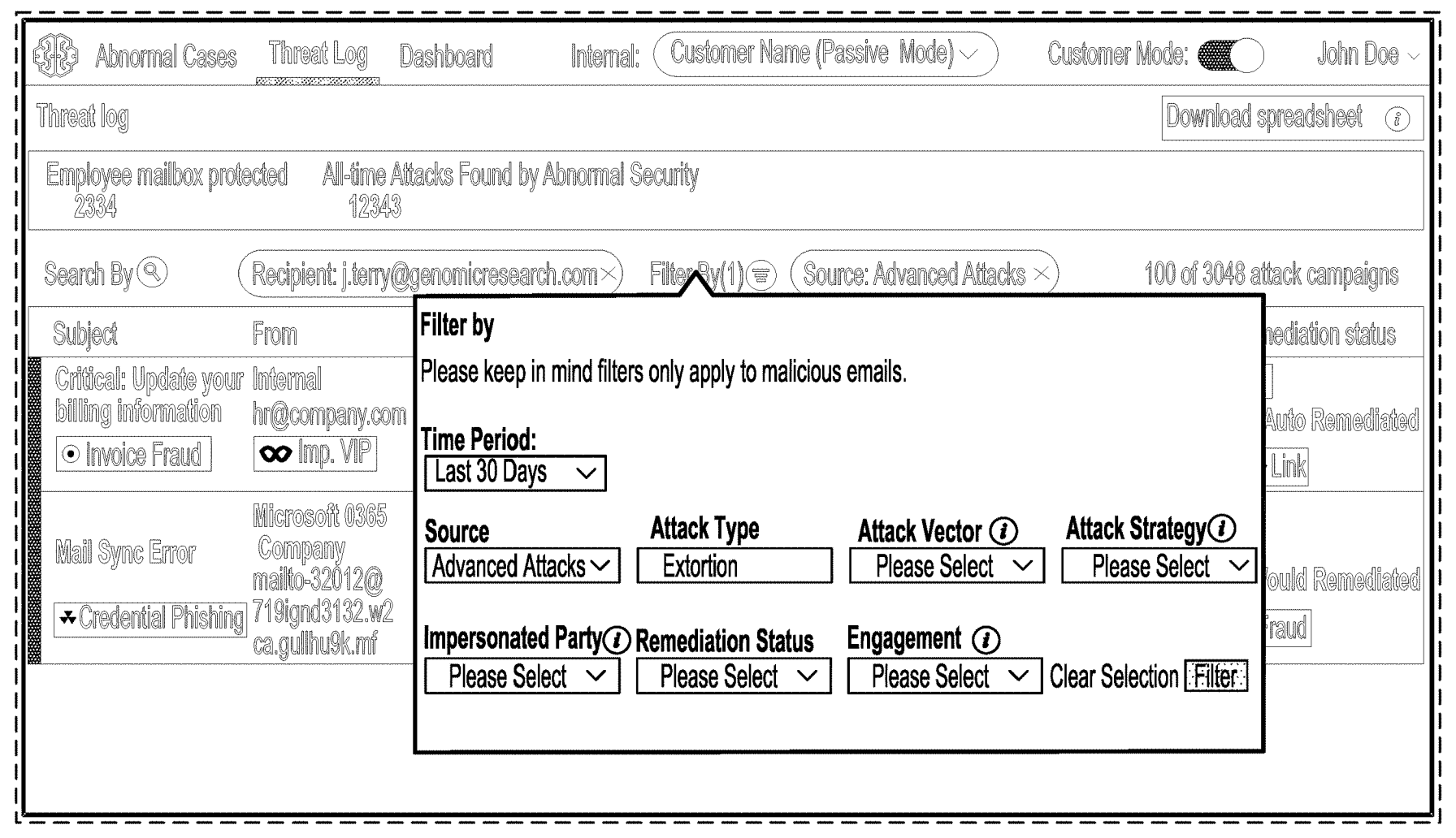

FIGS. 10A-J include examples of interfaces showing how an individual (also referred to as a "user" of the threat detection platform) could filter the records of digital activities performed with accounts associated with the employees of an enterprise.

FIG. 11 includes a summary of several core features of the portal supported by the threat detection platform.

Figure 1:
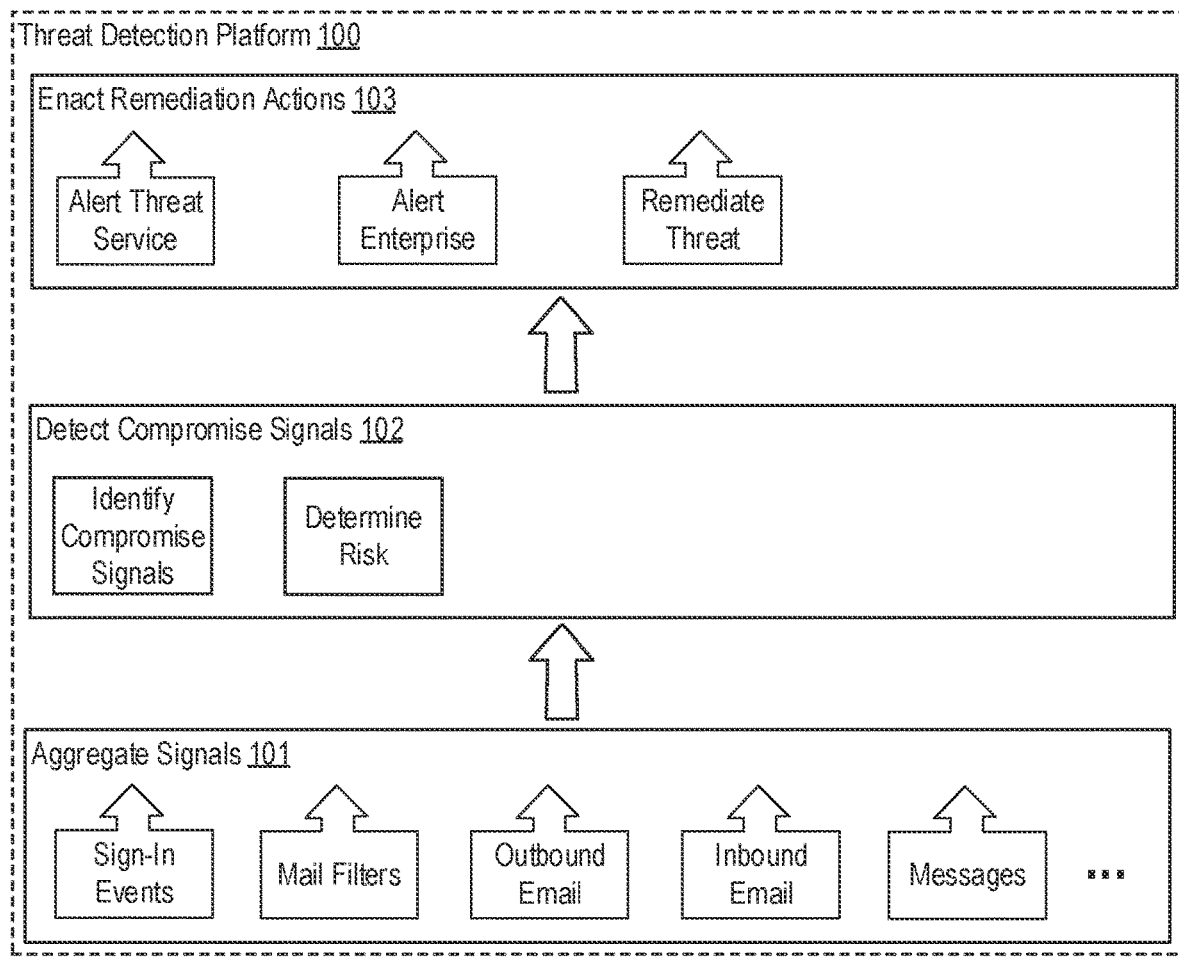
FIG. 1 illustrates how a threat detection platform may employ a multi-tiered approach to aggregate information (also referred to as "signals") related to the employees of an enterprise, examine the signals to discover compromise signals that may be indicative of account compromise, and then enact remediation actions to address the threat to an enterprise.

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Traditionally, enterprises have protected themselves against business email compromise (BEC) campaigns by employing various defenses. For example, an enterprise may employ a filter that quarantines malicious emails, a whitelist that identifies non-malicious domains, a blacklist that identifies malicious domains, or an identification scheme that causes internal emails to be visually distinguishable from external emails. As another example, an enterprise may employ a detection scheme that causes emails with extensions similar to the domain of the enterprise to be flagged. Thus, if the domain for the enterprise is ABC_Company.com, the detection scheme could flag an email as possibly fraudulent in response to a determination that its domain is ABC-Company.com. These defenses are largely ineffective against some BEC campaigns, however. For example, instances of account compromise (also referred to as "account takeover") may go unnoticed since the attacks can originate from within the enterprise.

To address this issue, some enterprises have begun employing threat detection platforms that are designed to identify threats based on an analysis of digital activities performed with the accounts of employees. As an example, a threat detection platform could examine the digital activities performed with accounts associated with employees to determine whether any of those accounts are exhibiting abnormal behavior. The threat detection platform can train a computer-implemented model (or simply "model") using information related to digital activities that were performed with an account in the past in order to create a trained model that understands what constitutes normal behavior of that account. Generally, these models are based on one or more machine learning algorithms, and thus may also be referred to as "machine learning models" or "ML models." Further information regarding discovering deviations in behavior through analysis of digital activities can be found in U.S. application Ser. No. 17/094,801, titled "Discovering Email Account Compromise Through Assessments of Digital Activities," and U.S. application Ser. No. 17/190,105, titled "Multichannel Threat Detection for Protecting Against Account Compromise," each of which is incorporated herein in its entirety.

Information regarding possible threats—such as those surfaced by a threat detection platform—may be examined by security operations center (SOC) analysts. However, this information is normally exported into a third-party service (also referred to as a "third-party tool") that has historically been used by the SOC analysts for further review. Using the third-party service, the SOC analysts can review the information in order to determine what remediation actions, if any, are appropriate to address the possible threats. But this approach is problematic in several respects. First, the SOC analysts may need to alternate between multiple tools (e.g., the third-party service and threat detection platform) in order to identify, review, or remediate threats. This can be especially burdensome for SOC analysts that are responsible for addressing a large number of threats in near real time (e.g., on the scale of dozens or hundreds of threats per day). Second, the information that is exported into the third-party service will normally be limited to those digital activities that have been deemed unsafe by the threat detection platform. This can make it difficult, if not impossible, for SOC analysts to discover and then address situations where digital activities were erroneously deemed safe by the threat detection platform.

Introduced here, therefore, is a threat detection platform designed to produce records of digital activities that are performed with accounts associated with employees of enterprises. Such an approach ensures that records are created for digital activities that are deemed unsafe and for digital activities that are deemed safe by a threat detection platform. At a high level, more comprehensively recording digital activities not only provides insight into the behavior of individual accounts, but also provides insight into the holistic behavior of employees across multiple accounts. Each record could be, for example, a data structure with fields that include information regarding the corresponding digital activity, such as its unique identifier, channel identifier, reception date, transmission date, source Internet Protocol (IP) address, content (e.g., subject), threat classification, threat type, remediation status, and the involved account(s). These records may be stored in a searchable database to enable expedient and efficient review. As further discussed below, these records could be used to create or maintain digital profiles (also referred to as "behavioral profiles" or simply "profiles") for the employees that can be used to detect attacks that are able to evade traditional defenses.

Moreover, the threat detection platform may be able to generate interfaces through which individuals can access the records following classification of the corresponding digital activities. These individuals (also referred to as "users" of the threat detection platform) may be SOC analysts, members of a security service responsible for managing the threat detection platform, or the employees themselves. Such a feature greatly improves these individuals' ability to perform investigations and address threats. For example, a SOC analyst may be able to search for receptions of an email that was marked safe by the threat detection platform but should be removed. Upon receiving a query for the email from the SOC analyst, the threat detection platform can return results that identify the email (and, in some instances, related emails that may be part of the same campaign) and then permit the SOC analyst to specify what actions should be performed. Thus, the SOC analyst may be able to delete the email despite it being previously deemed safe by the threat detection platform.

Rather than rely on third-party services to conduct limited investigations, SOC analysts can instead perform thorough investigations through the interfaces generated by the threat detection platform. By creating records for all digital activities—including those deemed safe—that are performed with accounts of interest, the threat detection platform enables more comprehensive investigations to occur. For example, the threat detection platform may allow SOC analysts to search emails received and/or transmitted by employees of an enterprise and then remediate threats as necessary regardless of how the threat detection platform classified those emails. Such an approach allows SOC analysts to remediate threats that were identified by the threat detection platform and threats that were not identified by the threat detection platform.

In sum, enterprises are increasingly being targeted by sophisticated attacks that have never been seen before. These sophisticated attacks cannot be stopped by conventional security products, for example, due to the reliance on whitelists and blacklists for identifying threats. In contrast to these conventional security products, the threat detection platform described herein employs a behavioral data science approach to stop these sophisticated attacks. Moreover, the threat detection platform may extract compromise signals (also referred to as "indicators of compromise") to create its own threat intelligence feed. This threat intelligence feed can be either published to an external aggregation service (e.g., Anomali) employed by the enterprise whose employees are being monitored or piped into other security products (e.g., SEGs). Thus, the threat intelligence feed could be used for block-listing, among other things, by SOC analysts employed by the enterprise.

Embodiments may be described in the context of a certain channel for the purpose of illustration. However, those skilled in the art will recognize that the technology could be employed across various channels. Moreover, embodiments may be described in the context of a certain type of digital activity, such as the transmission of an email via a collaboration suite or a message via a communication platform, for the purpose of illustration. However, those skilled in the art will recognize that the technology is equally applicable to other types of digital activities.

Embodiments may also be described in the context of computer-executable instructions for the purpose of illustration. However, aspects of the technology can be implemented via hardware, firmware, or software. As an example, a computer-readable medium may include instructions that, when executed by a processor of a computing device, cause the computing device to cause display of an interface, receive input indicative of a search query that is specified through the interface, examine emails included in a safe index and/or a non-safe index to identify matching emails that satisfy the search query, and then post those matching emails to the interface as results. Moreover, the interface may enable an individual to specify what actions, if any, should be taken with respect to the matching emails.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The terms "comprise," "comprising," and "comprised of" are to be construed in an inclusive sense rather than an exclusive sense (i.e., in the sense of "including but not limited to"). The term "based on" is also to be construed in an inclusive sense rather than an exclusive sense. Thus, unless otherwise noted, the term "based on" is intended to mean "based at least in part on."

The terms "connected," "coupled," and variants thereof are intended to include any connection or coupling between two or more elements, either direct or indirect. The connection/coupling can be physical, logical, or a combination thereof. For example, elements may be electrically or communicatively coupled to one another despite not sharing a physical connection.

The term "module" may refer broadly to software, firmware, and/or hardware. Modules are typically functional components that generate one or more outputs based on one or more inputs. A computer program may include or utilize one or more modules. Thus, a computer program may utilize multiple modules that are responsible for completing different tasks or a single module that is responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Threat Detection Platform

A threat detection platform can be designed to produce records of digital activities performed with accounts associated with employees of an enterprise and then discover, based on these records, possible instances of account compromise, external attacks, or internal attacks in order to identify threats to the security of the enterprise. As further discussed below, internal and external attacks can be medium non-specific. Thus, a threat detection platform could be programmed to identify different types of compromised accounts. Similarly, a threat detection platform could be programmed to identify attacks in different channels (also referred to as "forums") of communication, such as email, chat, and the like. For example, a threat detection platform may be configured to examine the digital activities performed with accounts associated with employees of the enterprise to determine whether any of these accounts are exhibiting abnormal behavior. For each account, this determination could be based on the nature of the digital activities performed with that account and/or the other accounts with which that account has interacted. While embodiments may be described in the context of email accounts, those skilled in the art will recognize that the threat detection platform could monitor digital activities performed with other types of accounts, such as accounts for messaging platforms, integrated third-party services, etc.

As further discussed below, the threat detection platform may produce a record for each digital activity that is performed with an account under observation. The record could be, for example, a data structure with fields that include information regarding the corresponding digital activity, such as its unique identifier, channel identifier, reception date, transmission date, source IP address, content (e.g., subject), threat classification, threat type, remediation status, and the like. Moreover, the record may identify the account(s) involved in the corresponding digital activity. For example, if the digital activity involves the transmission or reception of an email, then the record may specify the transmitting account and receiving account. Accordingly, the threat detection platform may independently populate a data structure for each digital activity that is examined, and these data structures may be stored in a searchable database. In some embodiments, the threat detection platform maintains separate databases based on the threat classification. For example, the threat detection platform may maintain one index of records corresponding to digital activities that have been deemed safe and another index of records corresponding to digital activities that have been deemed unsafe. Additionally or alternatively, the threat detection platform may maintain a separate index for each employee that includes records for safe and unsafe digital activities.

Generally, an account will be identified as possibly compromised if the threat detection platform discovers that the account either (i) performed at least one digital activity that deviated from past behavior in a meaningful way or (ii) performed at least one digital activity that increased the risk to the security of the enterprise. One example of a digital activity that increases the risk to the security of the enterprise is the transmission of a message (e.g., via a communication platform, such as Slack®, Microsoft Teams™, or Google Chat™) that includes a uniform resource locator (URL) for a phishing page. Other examples of risky digital activities include the transmission of a fraudulent invoice via internal email and the transmission of a phishing attack via internal email. The term "internal email" refers to emails sent within an enterprise (e.g., from an email account associated with one employee to an email account associated with another employee). Internal emails are normally delivered via an enterprise mail system (also referred to as a "corporate mail system") without traversing the Internet. The term "external email," meanwhile, may refer to emails that are received from, or transmitted to, addresses external to the enterprise.

As further discussed below, the threat detection platform may build a separate model for each account associated with an enterprise that is representative of the normal behavior of the corresponding employee. The threat detection platform can compare the digital activities performed with each account to the corresponding model to see whether any deviations exist. A deviation may be indicative of potential compromise since it means the behavior of the account has changed. By establishing what constitutes normal behavior on a per-employee basis, the threat detection platform can more readily discover and then address instances of account compromise before the enterprise is harmed.

Moreover, the threat detection platform may leverage machine learning, heuristics, rules, or human-in-the-loop feedback to improve its ability to discover instances of account compromise. For example, the threat detection platform may employ a series of rules that separately examine attributes of a communication generated by an account. Note that the term "communication" may be used to refer to emails, messages, and the like. Examples of attributes include time of transmission, geographical origin, sender identity, sender account identifier (e.g., email address or phone number), recipient identity, recipient account identifier, subject, body content, presence or content of attachments, etc. Based on these attributes, the series of rules may indicate whether the account should be examined further due to suspected compromise.

If the threat detection platform determines that an account may be compromised, the threat detection platform may automatically determine which remediation actions, if any, are appropriate. The remediation actions may depend on the confidence level of the threat detection platform in its determination, the types of digital activities that prompted suspicion, or the threat posed by the compromise. For example, if the threat detection platform determines there is a low likelihood that the email account has been compromised, then the threat detection platform may simply identify the account as needing further monitoring. However, if the threat detection platform determines there is a high likelihood that the account has been compromised, then the threat detection platform may restrict access to an enterprise network or prevent further digital activities from being performed. For instance, the threat detection platform could temporarily divert communications generated by the account into a quarantine environment until further analysis can occur. As another example, the threat detection platform may terminate all active sessions of the account and prompt the true owner to reset the password. As another example, the threat detection platform may post a notification that specifies the account may be compromised in a chat thread in which the account participates. As further discussed below, the likelihood that the account has been compromised may be determined based on the volume, nature, or type of digital activities performed with the account under examination.

To generate a more holistic summary of the conduct of an employee, the threat detection platform can generate a record of each digital activity performed with one of the accounts associated with the employee. These records can then be stored in a behavioral profile (or simply "profile") that is associated with the employee. Some employees will be associated with multiple accounts. For example, a given employee may be associated with a first account for a collaboration suite and a second account for a communication platform. With the behavioral profile, the threat detection platform can gain a better understanding of the conduct of the employee with these different accounts across different channels.

FIG. 1 illustrates how a threat detection platform 100 may employ a multi-tiered approach to aggregate information (also referred to as "signals") related to the employees of an enterprise (step 101), examine the signals to discover compromise signals that may be indicative of account compromise (step 102), and then enact remediation actions (step 103) to address the threat to an enterprise.

The threat detection platform 100 can be completely integrated within the enterprise environment. For example, the threat detection platform may receive input indicative of an approval by an individual (e.g., an administrator associated with the enterprise) to access data related to the digital activities performed with accounts associated with employees of the enterprise. The data may include, for example, information on emails (e.g., incoming emails and outgoing emails), messages, third-party service usage (e.g., access events, access locations, document views, and document requests), intranet usage (e.g., access events, queries, and document views), telephonic activity, mail filters, mail groups, sign-in events, identity risk events, active directory, accessed documents, etc. The approval may be given through an interface generated by the threat detection platform 100. For example, the individual may access an interface generated by the threat detection platform 100 and then approve access to the data as part of a registration process.

Then, the threat detection platform 100 can establish a connection with one or more storage mediums that include the data via corresponding application programming interfaces (APIs). For example, the threat detection platform 100 may establish, via an API, a connection with a computer server managed by the enterprise or some other entity on behalf of the enterprise. The threat detection platform 100 can download the data from the storage medium(s) into a programming environment managed by the threat detection platform 100. For instance, the threat detection platform 100 may obtain information regarding the outgoing emails, outgoing messages, intranet access events, mail filters, or sign-in events associated with each account managed by the enterprise. As further discussed below, the threat detection platform 100 may process the information in order to define a series of digital activities performed with each account over time. As mentioned above, the information that defines each digital activity may be referred to as a "signal," and each signal can be encoded into a data structure that may be referred to as a "record." As further discussed below, the records produced by the threat detection platform 100 may be designed to be readily searchable by field.

Accordingly, the threat detection platform 100 may be designed to obtain and/or monitor data in at least one datastore via respective APIs, aggregate the data in these datastores, and then canonicalize the data into a single event stream in order to perform behavioral analysis (e.g., by detecting deviations in behavior). Such an approach ensures that the data in these various datastores (also referred to as "databases") can be holistically monitored to gain a better understanding of behavioral patterns on a per-account, per-employee, or per-enterprise basis. Since the data can be accessed via APIs, direct integration (e.g., into the computing environment of an enterprise) normally is not necessary.

In some embodiments, the threat detection platform 100 is programmed to build a separate machine learning (ML) model for each employee based on the retrospective information regarding the digital activities performed with the corresponding account in order to better identify instances of account compromise in near real time. For example, the threat detection platform 100 may ingest digital activities performed with an account over the last six months, and then the threat detection platform may build an ML model that understands how the account normally accesses a collaboration suite or communication platform (e.g., based on sign-in events, geographical location, etc.). As another example, the threat detection platform may build an ML model that understands how the account normally communicates internally (e.g., with other employees) or externally (e.g., with vendors). The ML model may help identify when the behavior of the account has changed.

Such an approach allows the threat detection platform 100 to employ an effective ML model nearly immediately upon receiving approval from the enterprise to deploy it. Unlike conventional security products that only have access moving forward in time (i.e., after receiving the approval), the threat detection platform 100 may employ a backward-looking approach to develop ML models that are effective upon deployment. Such an approach also enables the threat detection platform to go through a repository of past digital activities to identify whether any accounts should presently be suspected of compromise.

The aforementioned API-based approach provides a consistent way of looking at information related to the digital activities performed with accounts belonging to employees of an enterprise. Because the threat detection platform 100 can directly access the communications transmitted and received by these accounts, the threat detection platform 100 can examine the communications that are invisible to standard integration solutions. For example, an SEG integration that occurs through a mail exchanger (MX) record will only be able to see external emails arriving from, or destined for, external sources. The only way to make internal emails visible to the SEG integration would be to externally reroute the emails through the gateway, and purely internal communications such as messages are completely invisible to the SEG integration.

The threat detection platform 100 may design, generate, and train the ML models to discover possible instances of account compromise by examining the aggregated signals. As shown in FIG. 1, the threat detection platform 100 can parse the aggregated signals to identify compromise signals (also referred to as "indicators of compromise (IOCs)") that indicate an account may be compromised, and then the threat detection platform can determine the risk to the enterprise based on the compromise signals. The term "compromise signal," as used herein, may refer to information related to a digital activity that indicates the corresponding account may be compromised. One example of a compromise signal is a URL for a phishing page discovered in the body of a message delivered via a communication platform, such as Slack, Microsoft Teams, or Google Chat. Another example of a compromise signal is a recipient account that has not been contacted in the past.

If the threat detection platform 100 discovers a compromise signal related to the digital activity, the threat detection platform 100 may determine what remediation actions, if any, are appropriate as shown in FIG. 1. For example, the threat detection platform 100 may notify a threat service (also referred to as a "security service") that the account may be compromised. As another example the threat detection platform 100 may notify the enterprise that the account may be compromised. For instance, the notification may be delivered to an individual in the information technology (IT) department of the enterprise. Additionally or alternatively, the threat detection platform 100 may automatically perform remediation actions based on the confidence level of the threat detection platform 100 in its determination, the types of digital activities that prompted suspicion, or the threat posed by the compromise.

Figure 2:
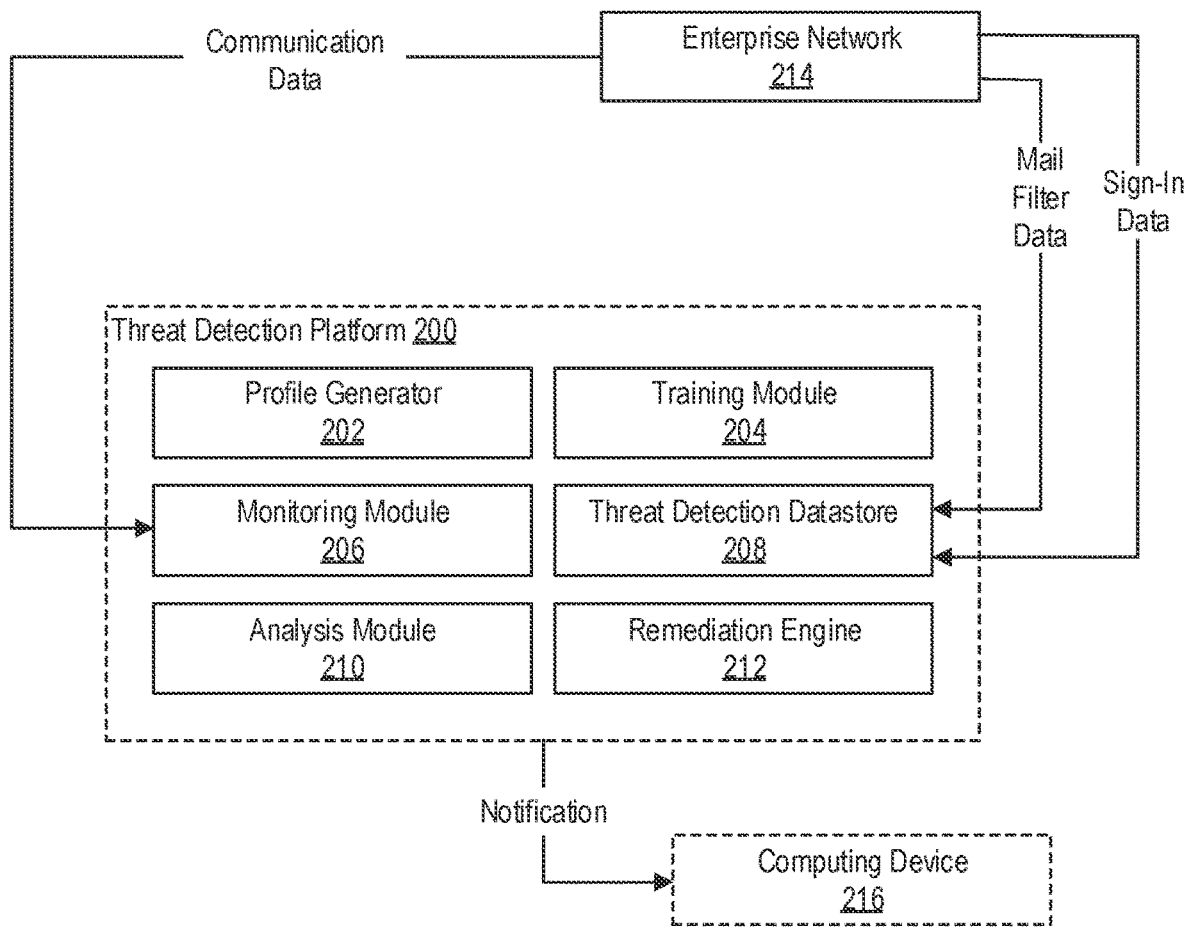
FIG. 2 depicts an example of a threat detection platform able to detect threats to an enterprise network posed by compromised accounts belonging to employees.

FIG. 2 depicts an example of a threat detection platform 200 able to detect threats to an enterprise network 214 (also referred to as a "customer network" or "corporate network") posed by compromised accounts belonging to employees. Examples of accounts include email accounts associated with collaboration suites (e.g., Microsoft Office 365 or Google Workspace), messaging accounts associated with messaging platforms (e.g., Slack, Microsoft Teams, or Google Chat), and accounts associated with other integrated third-party services. The term "other integrated third-party services" may refer to third-party services that are used by employees but not for communication purposes. Examples of other third-party services include Adobe Creative Cloud and Acrobat, Workday, Box, Microsoft OneDrive, and Dropbox.

As shown in FIG. 2, the threat detection platform 200 may include a profile generator 202, a training module 204, a monitoring module 206, a threat detection datastore 208, an analysis module 210, and a remediation engine 212. Some embodiments of the threat detection platform 200 include a subset of these components, while other embodiments of the threat detection platform 200 include additional components that are not shown in FIG. 2.

At a high level, the threat detection platform 200 can acquire data related to digital activities involving the accounts and then determine, based on an analysis of the data, whether any of these accounts have been compromised. As shown in FIG. 2, the data may include information related to communications, mail filters, sign-in events, and the like. Thus, the threat detection platform 200 can detect possible instances of account compromise based on an analysis of messages (e.g., the content or attachments), emails (e.g., the content or attachments), communication metadata (e.g., information regarding the sender, recipient, origin, time of transmission, etc.), sign-in metadata (e.g., information regarding the time and location of each sign-in event), and other suitable data.

Additionally or alternatively, the threat detection platform 200 may be able to obtain data related to digital activities involving the accounts from a third-party service as further discussed below. For example, the threat detection platform 200 may obtain data from a third-party service instead of, or in addition to, the data obtained from the enterprise network 214.

Accordingly, the threat detection platform 200 can be implemented, partially or entirely, within the enterprise network 214, a remote computing environment (e.g., through which communications, or information related to those communications, can be routed for analysis), a gateway, or another suitable location. The remote computing environment can belong to, or be managed by, the enterprise or another entity. The threat detection platform 200 may be integrated into (i) the enterprise's email system via an API and (ii) one or more third-party services via respective APIs. As an example, the threat detection platform 200 may receive data regarding emails received and transmitted by a first set of accounts via a first API (e.g., the Microsoft Outlook® API) and data regarding messages received and transmitted by a second set of accounts via a second API (e.g., the Slack API).

In a first variation, the threat detection platform 200 is maintained by a threat service (also referred to as a "security service") that has access to multiple enterprises' data. In this variation, the threat detection platform 200 can route data related to digital activities to a computing environment managed by the security service. The computing environment may be, for example, an instance on Amazon Web Services (AWS). The threat detection platform 200 may maintain one or more databases for each enterprise that includes, for example, organization charts, attribute baselines, communication patterns, etc. Additionally or alternatively, the threat detection platform 200 may maintain federated database(s) shared amongst multiple entities such as detector databases, vendor databases, etc. The security service may maintain different instances of the threat detection platform 200 for different enterprises, or the security service may maintain a single instance of the threat detection platform 200 for multiple enterprises. The data hosted in these instances can be obfuscated, encrypted, hashed, depersonalized (e.g., by removing personal identifying information), or otherwise secured or secreted. Accordingly, each instance may only be able to access/process data related to the digital activities performed with the accounts associated with the corresponding enterprise(s).

In a second variation, the threat detection platform 200 is maintained by the enterprise whose communications are being monitored (e.g., either remotely or on premises). In this variation, all relevant data related to digital activities can be hosted by the enterprise itself, and any information to be shared across multiple enterprises can be shared with a computing system maintained by the security service or a third party.

As shown in FIG. 2, the profile generator 202, training module 204, monitoring module 206, threat detection datastore 208, analysis module 210, and remediation engine 212 can be part of the threat detection platform 200. Alternatively, these components could be implemented individually. For example, the remediation engine 212 may be implemented in a remote computing environment to which the threat detection platform 200 is communicatively connected across a network. The threat detection platform 200 may be implemented by the security service, an enterprise, an individual associated with the enterprise, a trusted third party, or another service, entity, or individual. In some embodiments, aspects of the threat detection platform 200 are enabled by a web-accessible computer program operating on a computer server or a distributed computing system. For example, an individual may be able to interface with the threat detection platform 200 through a web browser executing on a computing device.

The enterprise network 214 can be a mobile network, wired network, wireless network, wireless spectrum network, or another communication network maintained by the enterprise or an operator on behalf of the enterprise. As noted above, the enterprise may utilize a security service to examine communications (among other things) to discover possible instances of account compromise. The enterprise may grant permission to the security service to monitor the enterprise network 214 by examining communications (e.g., messages, incoming emails, and outgoing emails), analyzing those communications to discover possible instances of account compromise, and then performing some remediation action if a threat is discovered. In some embodiments, the enterprise further grants permission to the security service to obtain data about other digital activities involving the enterprise (and, more specifically, employees of the enterprise) in order to build a profile that specifies communication patterns, behavioral traits, normal content, etc.

The threat detection platform 200 may include one or more databases in which records of digital activities, enterprise data, threat analysis data, remediation policies, communication patterns, behavioral traits, and other data can be stored. Here, for example, the threat detection platform 200 includes a threat detection datastore 208 that includes communication data, mail filter data, and sign-in data associated with the accounts belonging to employees of an enterprise. Other types of data, such as data related to identity risk events, could also be stored in the threat detection datastore 208. This data may be determined by the threat detection platform 200 (e.g., learned from data available on the enterprise network 214), provided by the enterprise, or retrieved from an external database (e.g., associated with Slack, Splunk, Microsoft Office 365, Google Workspace, LinkedIn®, etc.). In some embodiments, the threat detection datastore 208 also stores outputs produced by the threat detection platform 200, including machine- and human-readable information on discovered instances of account compromise and any remediation actions that were taken.

By examining the communication data, mail filter data, and sign-in data, the threat detection platform 200 can discover organizational information (e.g., the employees, titles, and hierarchy), employee behavioral traits (e.g., based on historical communications and historical sign-in events), normal communication content, normal email addresses, communication patterns (e.g., who each employee communicates with internally and externally, when each employee typically communicates, which channel each employee prefers), etc.

In some embodiments, the threat detection platform 200 includes a profile generator 202 that generates one or more profiles for the enterprise. For example, the profile generator 202 may generate a separate profile for each account associated with an employee of the enterprise based on the communication data, mail filter data, or sign-in data. Additionally or alternatively, profiles may be generated for business groups, organizational groups, or the enterprise as a whole. These profiles are preferably used as the baseline for what constitutes normal activity by each account (or group of accounts) but could be used in other manners.

A profile may include a series of records that are produced by the profile generator 202 over time. Generally, the profile generator 202 produces a separate record for each digital activity that is examined. Thus, the profile generator 202 could produce a record for each communication identified in the communication data, each mail filter identified in the mail filter data, each sign-in event detected in the sign-in data, etc. The record could be, for example, a data structure with fields that include information regarding the corresponding digital activity, such as its unique identifier, channel identifier, reception date, transmission date, source IP address, content, threat classification, threat type, remediation status, and the involved account(s). These data structures may be stored in a searchable database in the threat detection datastore 208. In some embodiments, separate databases are maintained for different threat classifications. For example, the profile generator 202 may sort the records into indexes (e.g., safe and unsafe indexes, or low-, moderate-, and high-risk indexes) after the threat posed by the corresponding digital activities is established by the analysis module 210.

A profile could also include a number of behavioral traits associated with the corresponding account. For example, the profile generator 202 may determine the behavioral traits based on the information encoded in the records. Thus, this information may be extracted or derived from the communication data, mail filter data, or sign-in data obtained from the enterprise network 214. The communication data may include information on the recipients of past communications (e.g., messages or emails) sent by a given account, content of the past communications, frequency of the past communications, temporal patterns of the past communications, formatting characteristics (e.g., usage of HTML, fonts, styles, etc.), sensitive topics on which the corresponding employee is explicitly or implicitly authorized to communicate, geographical location from which the past communications originated, and more. Thus, the profile generator 202 may attempt to build a profile for each account that represents a model of normal behavior of the corresponding employee (and, by extension, what may constitute abnormal behavior for purposes of identifying possible instances of account compromise).

Examples of questions that the profile may attempt to address for a given account include: What accounts does the given account communicate with? What topics does the given account normally discuss? What are normal login times for the given account? What are normal sending times for the given account? What IP addresses does the given account log in from? What geographical locations does the given account log in from? Does the given account have any suspicious filters set up (e.g., to automatically delete incoming emails that contain certain keywords to conceal illicit activity)? What tone/style does the given account use? What terms (e.g., "cheers" or "thanks") are typically used by the given account? When the given account sends communications with links/attachments, what are the characteristics (e.g., name, extension, type, and size) of those attachments?

The monitoring module 206 can monitor communications handled by the enterprise network 214, a collaboration suite used by the enterprise, or a communication platform used by the enterprise. These communications may include instant messages (or simply "messages") exchanged between accounts associated with employees of the enterprise, incoming emails (e.g., external emails and internal emails) received by accounts associated with employees of the enterprise, and outgoing emails (e.g., external emails and internal emails) transmitted by accounts associated with employees of the enterprise. Those skilled in the art will recognize that the same accounts need not necessarily perform all of these actions. For instance, for a given employee, the monitoring module 206 may examine the outbound email transmitted from a given email account, the messages posted by a given messaging account, the access events associated with a given third-party service account, etc.

In some embodiments, the monitoring module 206 is able to monitor communications in near real time so that actions can be taken if a possible instance of account compromise is discovered. For example, if the monitoring module 206 discovers that a message generated by an account indicates that the account may be compromised, the remediation engine 212 may temporarily prevent all outgoing messages transmitted by the account from reaching their intended destination. In some embodiments, the monitoring module 206 is able to monitor communications only upon the threat detection platform 200 being granted permission by the enterprise (and thus given access to the enterprise network 214).

The analysis module 210 can analyze each digital activity performed with an account to determine the likelihood that the account is compromised. As an example, the analysis module 210 may examine the information encoded in each record by the profile generator 202 to determine whether a given digital activity should be deemed safe or unsafe. For instance, the analysis module 210 may examine each communication received and/or transmitted by the account to determine whether those communications deviate from past communication activity. In such embodiments, the analysis module 210 may determine whether a given communication deviates from the past communication activity (and thus may be indicative of compromise) based on its primary and/or secondary attributes. For example, the analysis module 210 may determine that compromise is likely if an account logs into the enterprise network 214 in an unusual location (e.g., China) or at an unusual time (e.g., 3 AM) based on a comparison to past sign-in events. As another example, the analysis module 210 may determine that compromise is likely if an account transmits a message that deviates from the characteristics of past messages transmitted by that account (e.g., pertains to an unfamiliar topic, is delivered to an unfamiliar account, has different terminology or formatting, includes a link with no context).

The analysis module 210 can make use of heuristics, neural networks, rules, decision trees (e.g., gradient-boosted decision trees), or ML-trained algorithms (e.g., decision trees, logistic regression, linear regression). Accordingly, the analysis module 210 may output discrete outputs or continuous outputs, such as a probability metric (e.g., specifying likelihood of compromise), a binary output (e.g., compromised or not compromised), an attack classification (e.g., specifying the type of scheme employed), etc.

For each communication created by an account, the analysis module 210 may determine whether the communication deviates from traits (e.g., related to behavior, content, or context) learned from past communications involving the account. The deviation may be a numerical value or percentage representing a delta between a trait and a corresponding feature extracted from the communication. For example, if the trait specifies that messages are transmitted by Joe.Smith@Enterprise.com via a communication platform almost exclusively between 8 AM and 5 PM, then a message transmitted at 3 AM may be assigned a relatively high deviation value. However, if Joe.Smith@Enterprise.com sends messages between 5 PM and 8 AM approximately 20 percent of the time, then the deviation value will be lower than the previous example.

These deviation values can be fed by the analysis module 210 as input into one or more attack detectors, each of which can generate an output. Each attack detector may be a rules-based engine, heuristic engine, or ML model designed to detect possible instances of a given type of attack. For example, these deviation values may be fed into an ML model designed, generated, or trained to identify theft schemes. The analysis module 210 may flag the account as possibly compromised if an indication is received from the attack detector(s) that a deviation threshold has been exceeded.

The remediation engine 212 may perform one or more remediation actions in response to the analysis module 210 determining that an account may be compromised. The remediation action(s) may be based on the nature of the threat, the policies implemented by the enterprise, etc. These policies may be predefined or dynamically generated based on inference, analysis, or the data obtained from the enterprise network 214. Examples of remediation actions include moving communications generated by the compromised account into a hidden folder (also referred to as a "quarantine folder") for further analysis, preventing the compromised account from accessing resources on the enterprise network 214, sending notifications (e.g., to the actual employee, enterprise, or member of the security service), resetting the password of the compromised account, ending all active sessions of the compromised account, and resetting connections with services or databases accessible via the enterprise network 214.

The remediation engine 212 may provide results produced by the monitoring module 206 or some other output (e.g., a notification that an account may be compromised) to a computing device 216. The computing device 216 may be managed by the employee associated with the account under examination, an individual associated with the enterprise (e.g., a member of the IT department), or an individual associated with a security service. In some embodiments, the remediation engine 212 sends the output in a human-readable format for display on an interface accessible via the computing device 216.

Some embodiments of the threat detection platform 200 include a training module 204 that is responsible for training the ML model(s) employed by the analysis module 210. For example, if the analysis module 210 is designed to apply ML model(s) to the communication data, mail filter data, or sign-in data, the training module 204 can train the ML model(s) by feeding training data into those ML model(s). These data could be obtained directly from the enterprise network 214 as shown in FIG. 2, or these data could be obtained from other sources via respective APIs. The training data could include labeled digital activities (e.g., communications that have been labeled as attacks or non-attacks), policies related to attributes of those digital activities (e.g., that sign-in events occurring in a given geographical location are authentic due to the use of a virtual private network (VPN) service), etc. The training data may be employee- or enterprise-specific so that the ML model(s) are able to perform personalized analysis. In some embodiments, the training data ingested by the ML model(s) includes malicious communications that are representative of known instances of account compromise. For example, these malicious communications may include language known to represent instances of fraud. As another example, these malicious communications may include links to URLs or attachments known to represent instances of phishing.

Approaches to Deriving Threat Intelligence

By building profiles for the employees of an enterprise, the threat detection platform can model the behavior that is expected on a given channel or set of channels. With this approach to behavioral profiling, the threat detection platform can stop the following:

Never-before-seen attacks that would evade conventional security products, such as communications with new URLs linking to malicious websites.

Text-only attacks for which there is no malicious payload that would have historically prompted suspicion. Rather than rely on malicious payloads, sophisticated attackers have begun relying on social engineering by impersonating, for example, a vendor and then attacking an enterprise through the supply chain.

Communications from compromised external accounts that are not managed by, or associated with, the enterprise. As an example, sophisticated attackers have begun infiltrating accounts associated with vendors to mount attacks on the enterprise from an outside—albeit trusted—source.

The approach to behavioral profiling described herein allows the threat detection platform to detect these types of attacks that would evade traditional defenses.

One benefit of behavioral profiling on a consistent basis (e.g., accounting for each digital activity performed with a given account) is that IOCs can be extracted and then used to evaluate risk. As mentioned above, the term "IOC," as used herein, may refer to information related to a digital activity that indicates the corresponding account may be compromised. This information will vary depending on the nature of the digital activity. For instance, the threat detection platform may extract different IOCs from an email in comparison to a message or sign-in event.

As an example, assume that the threat detection platform is interested in evaluating the risk posed by an incoming email. To evaluate the risk, the threat detection platform can extract one or more IOCs and then determine, based on those IOCs, whether the incoming email is malicious. Normally, the IOCs are predetermined in the sense that the information extracted by the threat detection platform may depend on the nature of the digital activity. Here, for example, the threat detection platform may extract the following: URLs, domain, source IP address, source account identifier (e.g., source email address), cryptocurrency (e.g., Bitcoin) addresses, and fingerprints indicative of malware. With this information, the threat detection platform can evaluate the risk that is posed by the incoming email.

The intelligence learned through analysis of the IOCs can be combined with behavioral profiling of the account under examination and more traditional detection mechanisms employed by either the threat detection platform or another security product. Moreover, the threat detection platform may be able to produce a threat feed that can be exported in accordance with conventional standards such as Structured Threat Information eXpression (STIX™) and Trusted Automated eXchange of Indicator Information (TAXII™). The threat feed could include any insights gained by the threat detection platform. Accordingly, the threat detection platform can be used for several different purposes. The most important of these purposes is detecting incoming attacks, though the threat detection platform could also export insights for ingestion by other security products. Examples of security products include firewalls, gateways, and tools used to implement the Security Orchestration, Automation, and Response (SOAR) approach defining, prioritizing, and responding to incidents.

Figure 3:
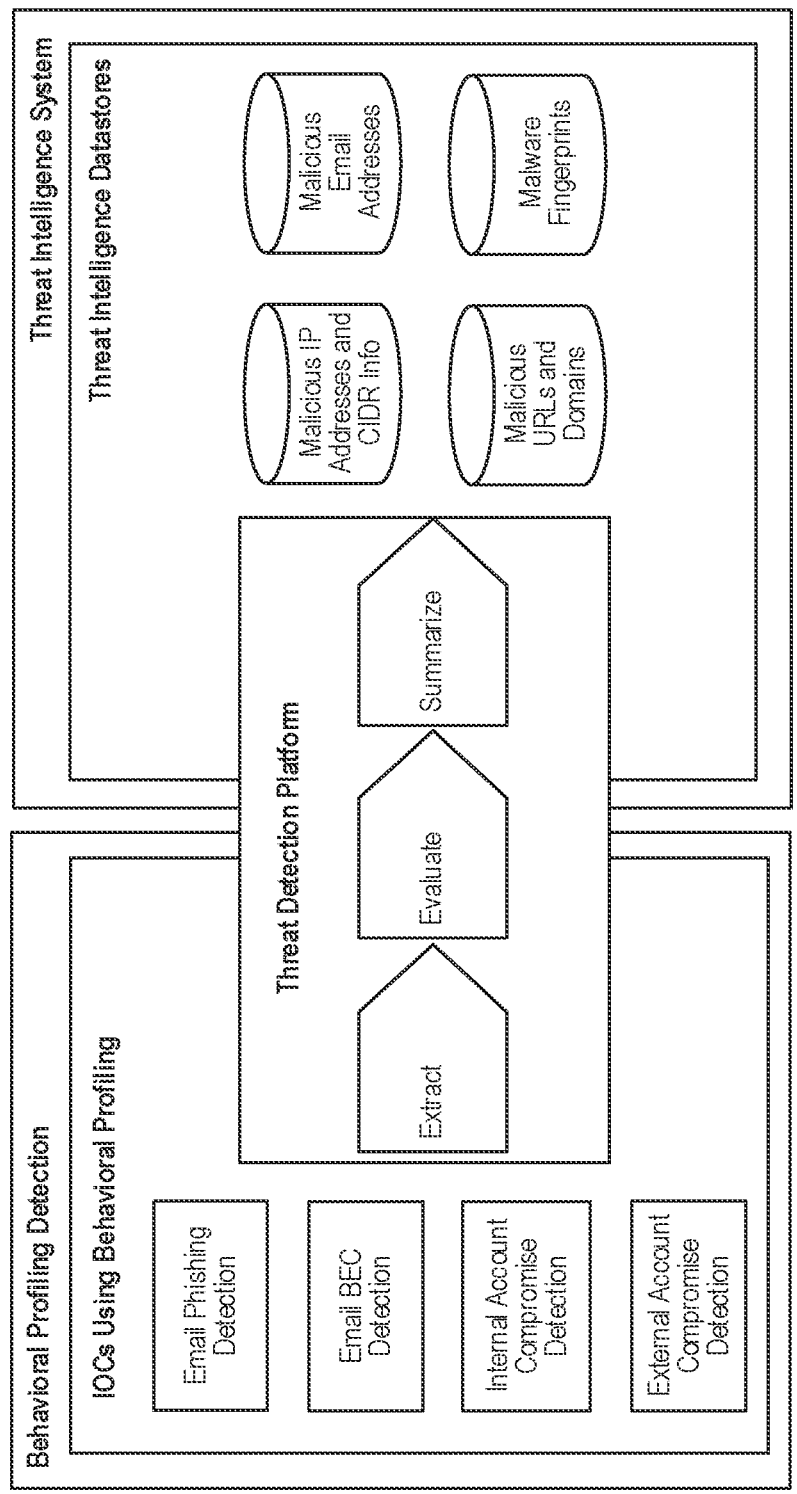
FIG. 3 includes a high-level diagram of a threat intelligence system of which the threat detection platform is a part.

FIG. 3 includes a high-level diagram of a threat intelligence system of which the threat detection platform is a part. As shown in FIG. 3, IOCs can be produced, extracted, or inferred from several different types of data. For example, the threat detection platform may consider data related to communications (e.g., emails and messages), mail filters, and sign-in events. In some embodiments, the threat detection platform overlaps those IOCs with profiles generated for the corresponding accounts. Thus, the threat detection platform may attempt to compare a given digital activity (and its IOCs) to past digital activities performed with the same account so that a score can be attributed to the given digital activity. This score may be indicative of the threat posed by the given digital activity, and thus may be used to establish an appropriate remediation action. Over time, the threat detection platform can create and then maintain various datastores in which insights into threats are stored. Here, for example, insights gained by the threat detection platform are stored in four separate datastores, namely, for malicious IP addresses and Classless Inter-Domain Routing (CIDR) information, malicious email addresses, malicious URLs and domains, and malware fingerprints.

Other aspects of the threat intelligence system could also produce IOCs that can be considered by the threat detection platform when evaluating the threat posed by digital activities. These aspects include:

Inbound Email Detection: Behavioral profiling can be used to detect malicious emails that are decomposed to extract the malicious IP addresses, email addresses, URLs, and domains that can be added to the datastores shown in FIG. 3.

Account Compromise Detection: Behavioral profiling can be used to establish what constitutes normal behavior for various accounts and then detect when a given account is exhibiting unusual behavior. Suspicious behavior may indicate that the given account is compromised. This form of behavioral profiling can surface malicious IP addresses, CIDR blocks, VPNs, network names, and network types that can be added to the datastores shown in FIG. 3.

Abuse Mailbox: Analyzing employee-reported emails in a dedicated mailbox is another way to detect malicious emails. Emails received in the dedicated mailbox can be decomposed into IOCs that can be added to the datastores shown in FIG. 3. More information on the abuse mailbox can be found in U.S. application Ser. No. 17/155,843, titled "Abuse Mailbox for Facilitating Discovery, Investigation, and Analysis of Email-Based Threats."

When deployed in this manner, the IOCs can be viewed as "predictive" in nature. That is, if the threat detection platform generalizes predictions across many attacks and then builds IOCs off those predictions, the threat detection platform can effectively define IOCs of interest without labeling (e.g., of the senders of malicious communications). This is a crucial difference with respect to conventional security products that identify malicious emails based on signatures that are known to be bad. The term "signature," as used herein, may refer to the combination of attributes associated with a digital activity that collectively define an event. The combination of attributes may be indicative of maliciousness of the corresponding digital activity. As such, the threat detection platform can use signatures to infer the risk of digital activities. In contrast to conventional security products, the threat detection platform can aggregate IOCs across many digital activities into datastores as shown in FIG. 3. After these IOCs have been labeled, the threat detection platform can use the labeled IOCs for threat analysis purposes rather than rely on generalizations of signatures.

Figure 4:
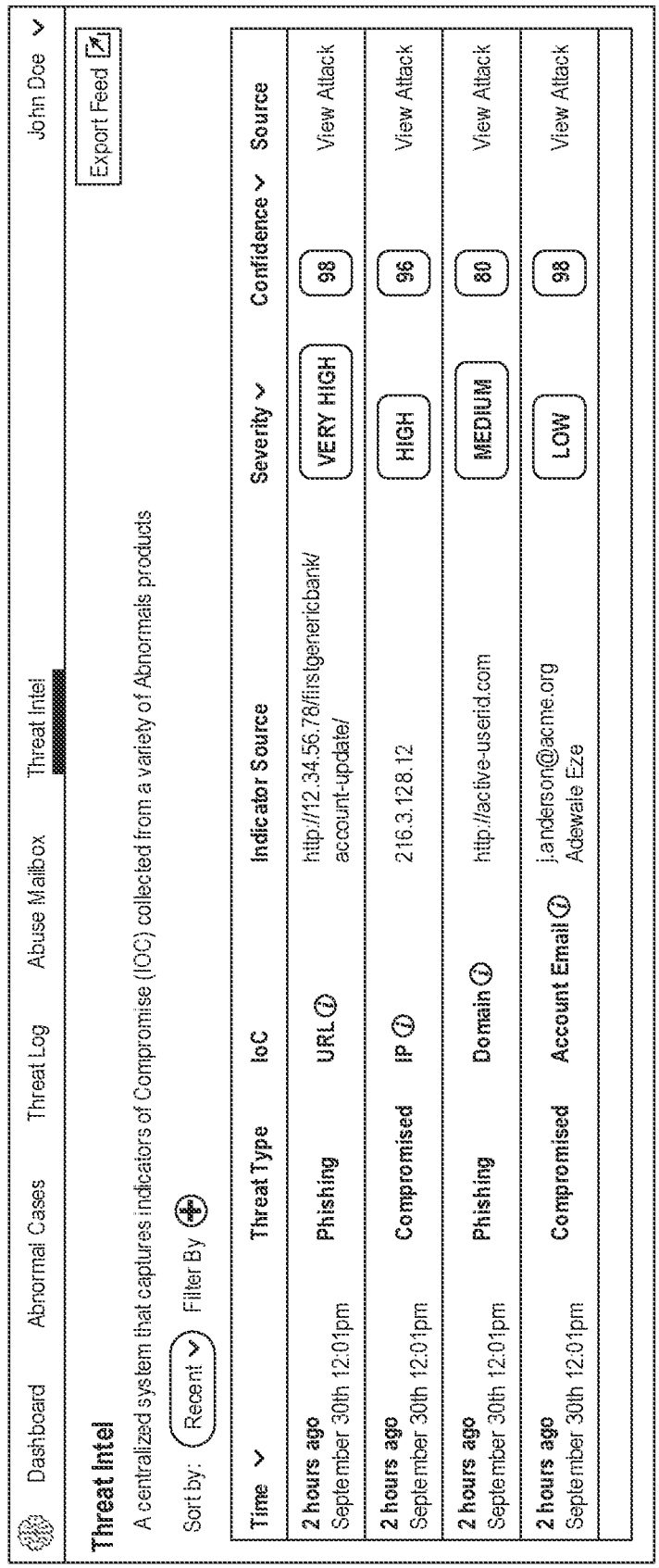
FIG. 4 includes an example of an interface that illustrates how threats can be surfaced for review.

FIG. 4 includes an example of an interface that illustrates how threats can be surfaced for review. At a high level, the threat intelligence system may be representative of a centralized system that captures and evaluates IOCs collected from one or more sources. These sources can include the threat detection platform and abuse mailbox.

As shown in FIG. 4, various information can be presented for each threat discovered by the threat intelligence system. This information may include the time of occurrence, threat type, source, and severity. Moreover, the threat intelligence system may specify the IOC that caused each digital activity to be deemed a threat. In some embodiments, the threat intelligence system also provides an indicator of confidence in its determination. Here, for example, each threat is accompanied by a score on a 0-100 scale that is representative of confidence in the threat determination. However, the threat intelligence system could alternatively use ranges (e.g., by indicating low, moderate, or high confidence) or colors (e.g., by assigning each threat one of multiple colors) to indicate the level of confidence.

Intelligence may be a core pillar of the value provided by the threat detection platform. One way to capture intelligence is to identify "good" values and "bad" values with respect to various IOCs. Assume, for example, that the threat detection platform is interested in establishing whether the presence of a given IOC (e.g., an email address) is actually indicative of compromise. Over time, the threat detection platform can establish the percentage of digital activities that (i) involve the given IOC and (ii) are determined to represent threats. If the percentage exceeds a threshold, then the threat detection platform may classify the given IOC as a "bad" value and then export that insight as threat intelligence. Accordingly, the fundamental basis of the threat detection platform—at least with respect to threat intelligence—may be to provide a counting mechanism that is run following detection of malicious communications, internal account compromise, and external account compromise.

Figure 5:
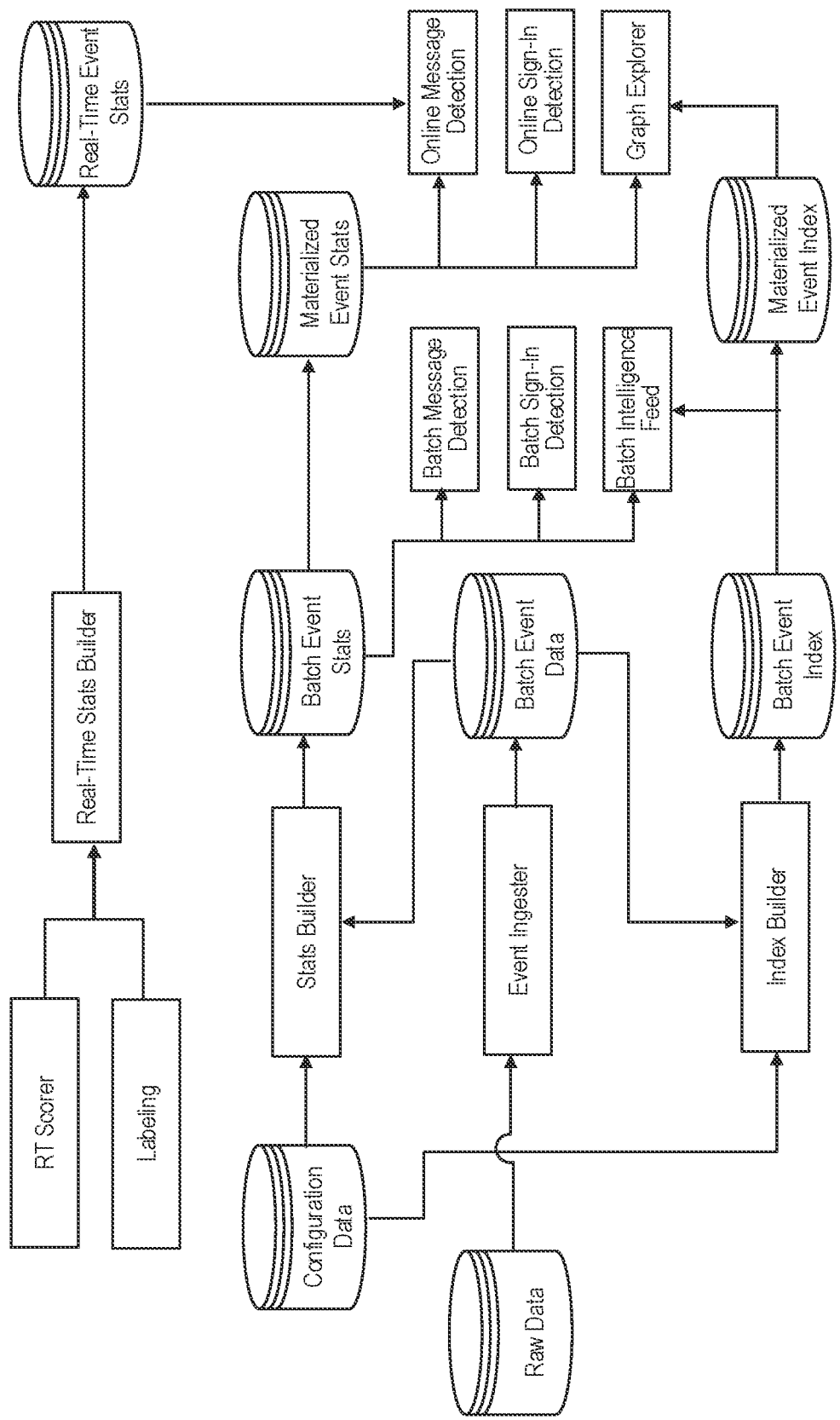
FIG. 5 includes a high-level illustration of a process by which a threat detection platform can derive threat intelligence.

FIG. 5 includes a high-level illustration of a process by which a threat detection platform can derive threat intelligence. As shown in FIG. 5, data can be obtained from several different sources. Here, the threat detection platform obtains configuration data and raw data. Configuration data may include instructions/rules that indicate whether the threat detection platform should "listen" for digital activities performed with a given account. Meanwhile, raw data can include information pertaining to the digital activities performed with a given account.

The event ingester module (or simply "event ingester") may be responsible for converting the raw data into an internal schema for digital activities (also referred to as "events"). The schema may be designed to hold various digital activities regardless of type (e.g., reception of email, reception of message, transmission of email, transmission of message, occurrence of sign-in event, creation of mail filter). The stats builder module (or simply "stats builder") may be responsible for mapping attributes corresponding to an interval of time to counts of digital activities.

Figure 6:
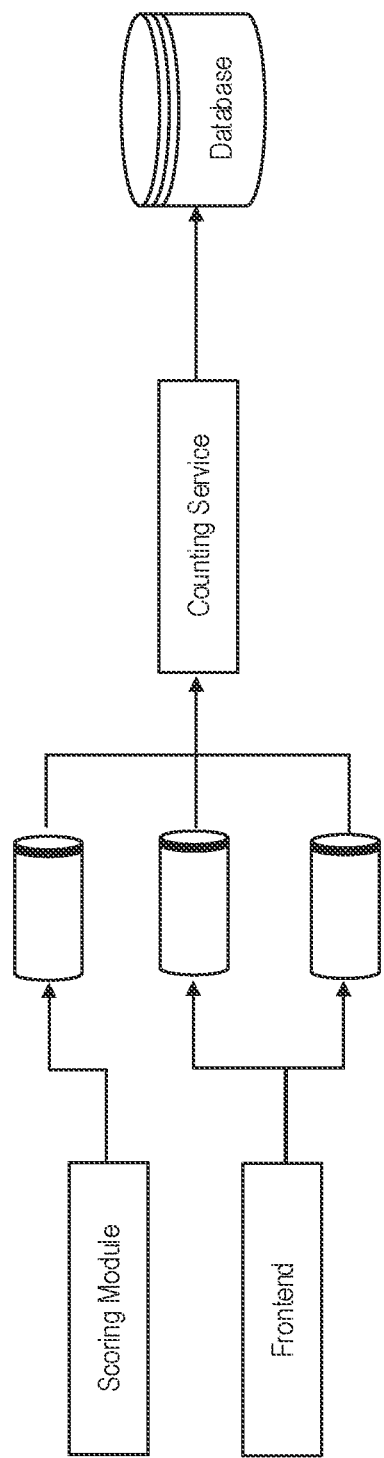
FIG. 6 includes a high-level illustration of a process by which a threat detection platform can "productionalize" a signature to be used to determine the threat posed by an account.

FIG. 6 includes a high-level illustration of a process by which a threat detection platform can "productionalize" a signature to be used to determine the threat posed by an account. Initially, a scoring module can process raw data related to the digital activities of the email account. Normally, this occurs in real time as those digital activities are being performed. The processed data associated with each digital activity can be passed to a counting service (also referred to as a "counting system") that converts the processed data into an event.

Moreover, each digital activity labeled through the frontend (e.g., via an interface generated by the threat detection platform) can be passed to the counting service, which converts the labeled digital activity into an event. The labels may indicate whether the digital activities represent a threat to the security of the enterprise with which the account is associated. For example, the labels may indicate that sign-in events that occur in certain geographical locations are authentic (and thus should not be flagged as possible instances of internal account compromise). As another example, the labels may indicate that communications originating from a given account should be flagged as possible instances of external (e.g., vendor) account compromise. Accordingly, the events derived from the labeled digital activities may be associated with a risk metric.

The events created by the counting service can be stored in a database (e.g., a Redis distributed database). This data may be formatted so that it can be easily queried for signatures. Thus, queries could be submitted, for example, for signatures determined not to represent a threat, signatures having a given attribute (or combination of attributes), etc.

Approaches to Comprehensibly Recording Digital Activities

FIG. 7 includes a flow diagram of a process 700 for generating and then employing digital profiles maintained for accounts associated with employees of an enterprise. Initially, a threat detection platform can obtain data that is related to a series of digital activities performed with accounts on a channel that is accessible to employees of an enterprise (step 701). As discussed above, the digital activities could include transmissions of communications, receptions of communications, occurrences of sign-in events, creations of mail filters, and the like.

Normally, the data is obtained by the threat detection platform from a datastore that is associated with the channel.

For example, the threat detection platform may establish, via an API, a connection with a datastore and then download, from the datastore via the API, the data into a local processing environment. In some embodiments, the datastore is managed by an entity that supports a collaboration suite used by the employees to exchange emails. Examples of collaboration suites include Microsoft Office 365 and Google Workspace. In other embodiments, the datastore is managed by an entity that supports a messaging platform used by the employees to exchange messages. Examples of communication platforms include Slack, Microsoft Teams, and Google Chat.

Then, the threat detection platform can parse the data to discover at least one attribute of each digital activity (step 702). Normally, the threat detection platform will derive, infer, or otherwise establish multiple attributes of each digital activity. Note, however, that the attributes will depend on the nature of each digital activity. Examples of attributes include channel, reception date, transmission date, source IP address, content (e.g., subject), and the like.

The threat detection platform can then determine the threat posed by each digital activity based on the corresponding attributes (step 703). For example, for each digital activity, the threat detection platform may provide, as input, the corresponding attributes to a model that is trained to establish whether the digital activity is a threat. At a high level, the model may determine the threat posed by the digital activity based on a comparison to past digital activities that were performed on the channel with the same account. In some embodiments, the model is designed to produce a metric that is indicative of the threat posed by a given digital activity. In such embodiments, the threat detection platform may assign a threat classification to the given digital activity based on the metric. As an example, the threat detection platform may determine, based on the metric, whether to classify the given digital activity as low, moderate, or high risk. As another example, the threat detection platform may simply use the metric itself as a classification mechanism if, for instance, the metric is generated on a 0-10 or 0-100 scale. Thereafter, the threat detection platform can generate a record of each digital activity by populating a data structure with (i) the corresponding attributes and (ii) an indication of the threat posed to the enterprise (step 704).

These records can then be populated into digital profiles that are maintained for the accounts (step 705). At a high level, each digital profile is representative of a historical account of all conduct on the channel by the corresponding account. Thus, each digital profile may include records of digital activities that have been deemed safe by the threat detection platform and records of digital activities that have been deemed unsafe by the threat detection platform. Such an approach to recording the conduct of accounts allows a more holistic understanding of behavior to be gained.

As mentioned above, the threat detection platform may be responsible for monitoring the conduct of accounts across multiple channels. For example, the threat detection platform may monitor digital activities performed with a first set of accounts on a first channel (e.g., an email channel) and digital activities performed with a second set of accounts on a second channel (e.g., a chat channel). While the first and second sets of accounts may be associated with different digital profiles, those profiles could be programmatically associated with one another in some instances. For example, the threat detection platform may indicate that a first account included in the first set of accounts and a second account included in the second set of accounts are associated with the same employee by appending an identical or comparable identifier in the digital profiles created for the first and second accounts.

Note that, in some embodiments, the threat detection platform is deployed such that data regarding digital activities is obtained on an ongoing basis. Said another way, data regarding digital activities may be obtained by the threat detection platform in real time as those digital activities are performed. Steps 702-705 may also be repeatedly performed such that digital profiles are continually updated as digital activities are performed (and thus threats are discovered).

In some embodiments, the threat detection platform is further configured to generate interfaces through which individuals (e.g., SOC analysts) can better understand threats to the enterprise by examining the records of digital activities. Examples of these interfaces are shown in FIGS. 9A-10J. Normally, these interfaces are accessed through a computer program that is executing on a computing device. Examples of computer programs include mobile applications, desktop applications, over-the-top (OTT) applications, and web browsers.

Figure 9A:
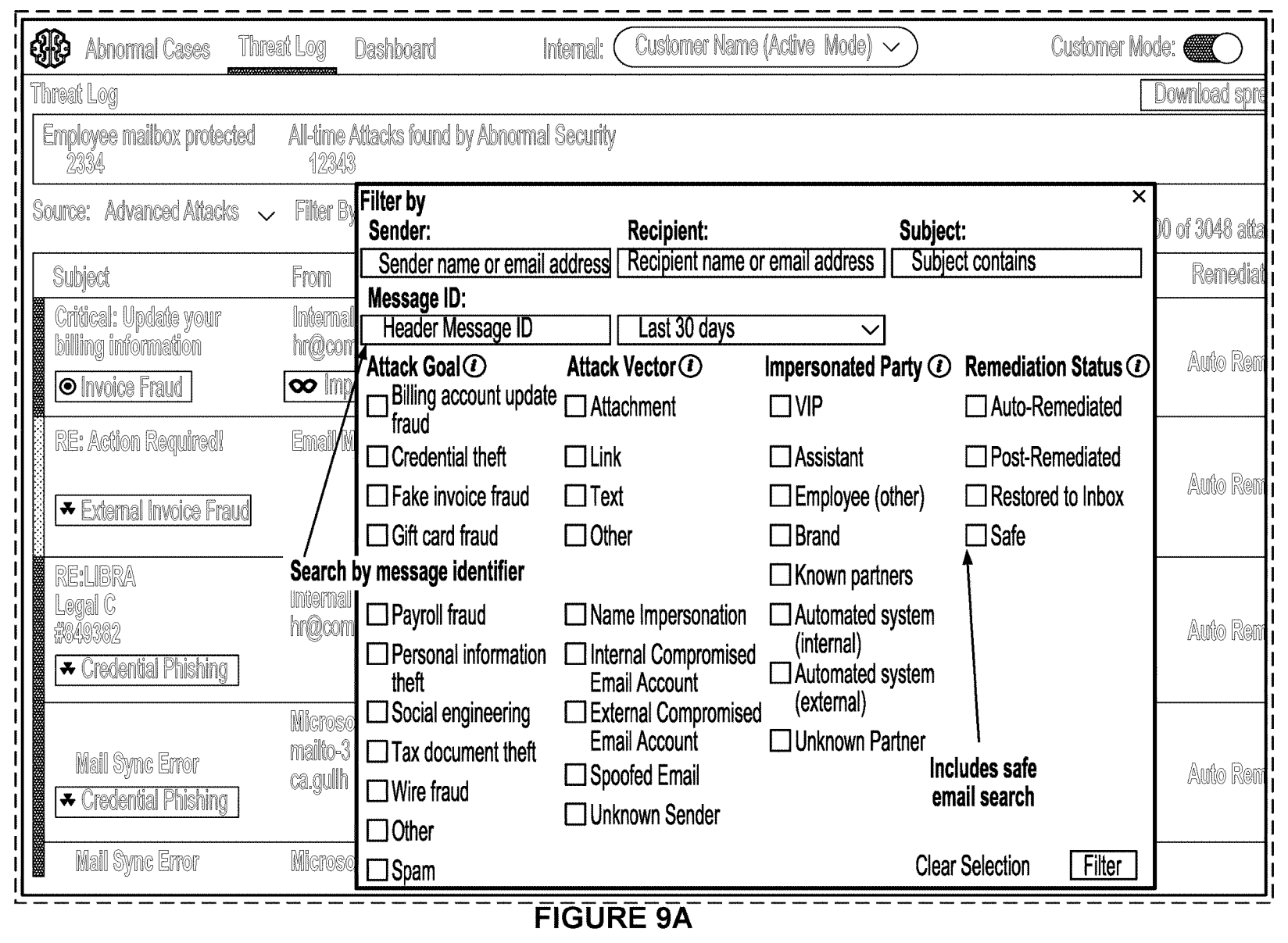

Accordingly, the threat detection platform may receive input, provided through the computer program, that is indicative of a query that specifies a criterion (step 706). In such a scenario, the threat detection platform can search the digital profiles to identify records, if any, that satisfy the query by having a given attribute that matches the criterion (step 707). As shown in FIG. 9A, for example, the query could specify multiple criteria in some embodiments. Thus, the query could specify sender name or email address, recipient name or email address, subject, identifier, timeframe, etc. Moreover, the threat detection platform can cause display of an interface by the computer program that specifies the matching records (step 708). As further discussed below, this interface may permit interaction so as to enable an individual to obtain more information regarding the matching records. For example, the individual may be able to select a given matching record in order to see more information regarding the corresponding digital activity.

Figure 8:
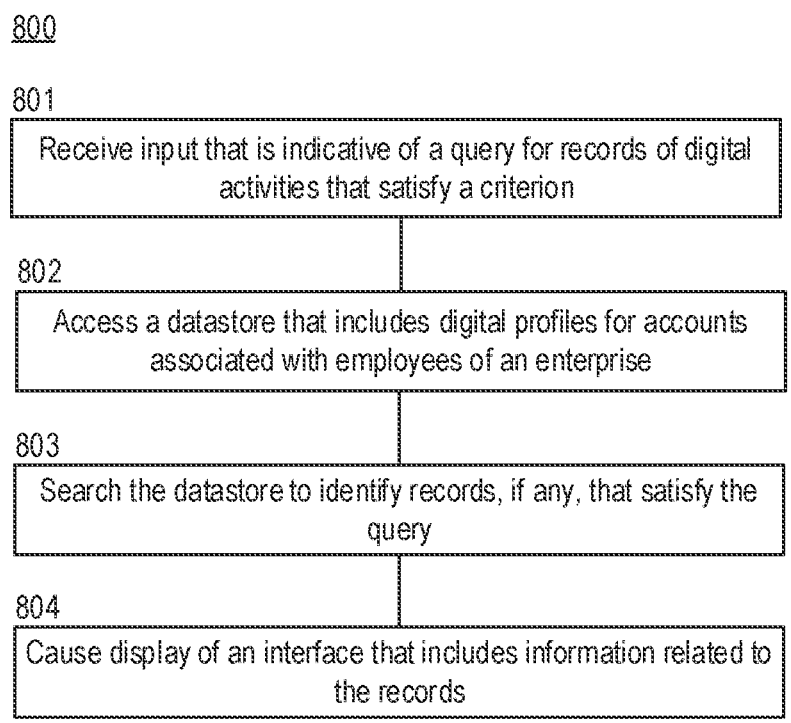
FIG. 8 includes a flow diagram of a process for querying a datastore to identify records of digital activities that satisfy a criterion.

FIG. 8 includes a flow diagram of a process 800 for querying a datastore to identify records of digital activities that satisfy a criterion. Initially, a threat detection platform can receive input that is indicative of a query for records of digital activities that satisfy a criterion (step 801). Normally, the query is specified through an interface that is generated by the threat detection platform. For example, an individual may seek to find records of digital activities involving a particular sender name or email address, recipient name or email address, subject, identifier, or any combination thereof. Additionally or alternatively, the individual may seek to find records of digital activities that have been classified as a certain threat type or a certain threat level, or that have a certain remediation status.

Thereafter, the threat detection platform can access a datastore that includes digital profiles for accounts associated with employees of an enterprise (step 802). These digital profiles may be generated and/or updated in accordance with the process shown in FIG. 7. Each digital profile may be associated with a corresponding account, and each digital profile may include a series of records of digital activities that have been performed with the corresponding account. Thus, each digital profile may be representative of a historical account of conduct of the corresponding account on a given channel over a given interval of time.

The threat detection platform can then search the datastore to identify records, if any, that satisfy the query (step 803). Moreover, the threat detection platform may cause display of an interface that includes information related to these records (step 804). Through the interface, an individual may be able to obtain more information regarding threats to the enterprise by interacting with the records shown on the interface. Moreover, the individual may be able to filter the records shown on the interface by specifying another criterion. Assume, for example, that the individual initially requests that the threat detection platform identify all records of communications that were transmitted to a given email address. In such a scenario, the individual may further specify that those records be filtered based on threat type or remediation status. Thus, the individual may be able to readily discover which of those communications have been classified as a certain type of threat but have not yet been remediated.

Unless contrary to possibility, these steps could be performed in various sequences and combinations. For example, a threat detection platform may continually perform the process of FIG. 7 such that digital profiles are constantly being generated, updated, and employed as digital activities are performed.

Other steps could also be included in some embodiments.

For example, records may be deleted, either continually or periodically, from digital profiles upon exceeding a certain age in some embodiments. Assume, for example, that the threat detection platform is programmed to remove records exceeding a certain age (e.g., 60, 180, or 365 days). This age could be determined by the threat detection platform (e.g., based on relevance to threat detection or consistency in behavior), or this age could be specified by an individual (e.g., a SOC analyst). The threat detection platform could remove records from digital profiles immediately upon reaching that threshold, or the threat detection platform could remove records on a periodic basis (e.g., weekly or monthly) based on age at that time.

As another example, the threat detection platform may produce, based on the records included in the digital profiles, a threat feed that can be exported to a security product in accordance with, for example, STIX or TAXII. For instance, the threat detection platform may format information regarding the digital profiles of accounts associated with employees of a given enterprise such that the information can be readily exported into a security product used by the given enterprise to detect, identify, or remediate threats.

Illustrative Examples of Interfaces Enabling Investigation of Threats

Historically, information regarding threats detected by threat detection platforms has been exported into third-party services, such as Splunk, for further review, for example, by SOC analysts. But this approach is problematic in several respects. First, the SOC analysts may need to alternate between several tools (e.g., the third-party service and threat detection platform) in order to identify, review, or remediate threats. This can be burdensome for SOC analysts that are responsible for addressing a large number of threats. Second, the information exported into the third-party service will normally be limited to those digital activities that have been deemed unsafe by the threat detection platform. This can make it difficult, if not impossible, for SOC analysts to discover and then address situations where digital activities were erroneously deemed safe. Said another way, false negatives—where the threat detection platform erroneously deemed a digital activity to be safe—may simply be invisible to the third-party service.

As discussed above, the threat detection platforms can be designed to produce records of all digital activities performed with accounts that are associated with the employees of enterprises. Such an approach ensures that records are created not only for digital activities that are deemed unsafe by a threat detection platform, but also for digital activities that are deemed safe by the threat detection platform. The threat detection platform may also be able to generate interfaces through which individuals (e.g., SOC analysts) can access, view, and sort these records. Through these interfaces (collectively referred to as a "portal"), those individuals can gain greater insight into threats than would otherwise be possible.

Individuals may also be able to specify actions that should be taken with respect to certain digital activities through the portal. Assume, for example, that a SOC analyst submits a query for an email that was marked safe by the threat detection platform but should be removed. In such a scenario, the threat detection platform can return results that identify the email and then permit the SOC analyst to specify what actions should be performed. For example, the SOC analyst may specify that the email should be deleted, or the SOC analyst may specify that the threat detection platform should search for other emails that share one or more attributes in common with the email.

From a technical standpoint, the threat detection platform may support any of the following features:
  Permit an individual to access communications that were deemed safe and unsafe.
    A subset of attributes (also referred to as "fields") for each record may be shown. Examples of attributes include the identifier, channel, sender, recipient, subject, time, and threat classification.
    A limited set of records (e.g., those corresponding to the last 30, 60, or 90 days) may be accessible via browsing or searching.
    Records for communications that were deemed safe may include less information or be less interactive.
  Allow an individual to report communications that were deemed safe as malicious. Said another way, permit the individual to identify communications that were falsely classified as non-malicious.
    The individual may be able to trigger an investigation by marking a communication as unsafe in the corresponding record.
    The individual may be able to select a communication to be retrieved, simulated, and rescored.
  Permit an individual to search communications using, for example, attributes such as identifier, channel, source IP address, and the like.

Such an approach not only obviates the need to export the records into a third-party service, but also provides greater visibility into the digital activities that were performed with accounts of interest. This is especially beneficial as employees are increasingly associated with multiple accounts. For example, a single employee could be associated with separate accounts for a collaboration suite, messaging platform, etc.

One scenario that highlights the benefits of such an approach is where a SOC analyst wishes to delete an email that was marked safe by the threat detection platform. This process may be referred to as "search and destroy." As discussed above, the SOC analyst would have historically been unable to complete this task since information may have only been available for digital activities that were deemed unsafe. Here, however, the SOC analyst can simply perform the above-mentioned task through the interfaces generated by the threat detection platform.

FIGS. 9A-B include examples of interfaces that illustrate additional features of the portal through which records can be viewed, accessed, and modified. As shown in FIG. 9A, the portal may permit communications to be searched by attribute. Here, for example, the interface includes fields in which an individual is able to specify the sender, recipient, subject, identifier, and timeframe. FIG. 9B, meanwhile, illustrates how communications that were deemed safe by the threat detection platform will still be discoverable through the portal, though less action may be permitted by the threat detection platform. For example, the threat detection platform may not retain as much information regarding safe communications, and thus may not allow clickthrough to further information as shown in FIG. 9B.

FIGS. 10A-J include examples of interfaces showing how an individual (also referred to as a "user" of the threat detection platform) could filter the records of digital activities performed with accounts associated with the employees of an enterprise. The individual could be, for example, a SOC analyst employed by the enterprise or a member of a security service that manages the threat detection platform. Taken together, FIGS. 10A-J illustrate how the individual is able to search for records associated with a single employee (Jason Terry) and then filter those records by attack type. More specifically, the individual filtered all records to those records in which jason.terry@xeroxparc.com is listed as the recipient. Then, the individual further filtered those records to ones in which extortion is listed as the attack type.

Figure 11:
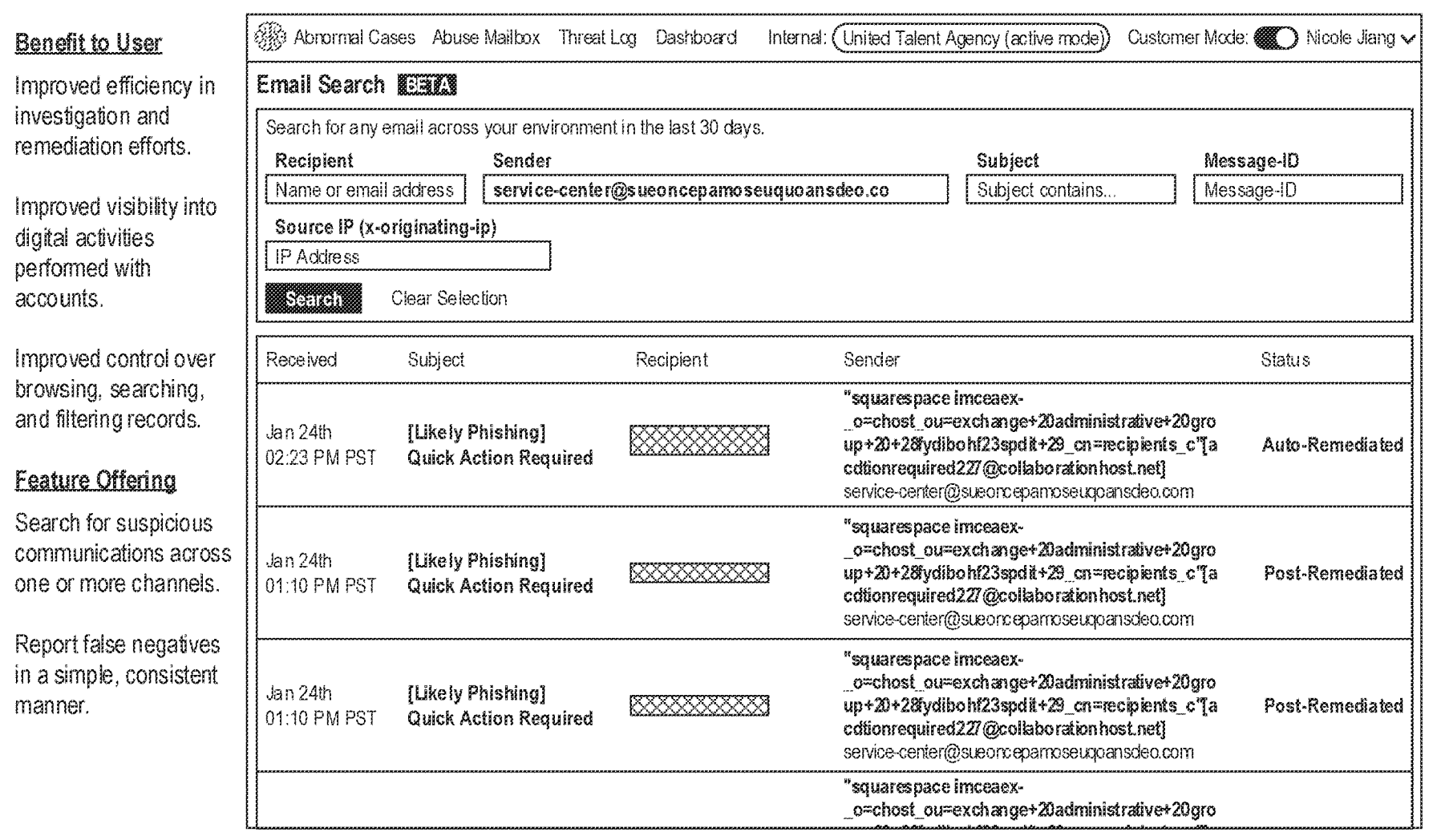

FIG. 11 includes a summary of several core features of the portal supported by the threat detection platform. These core features include (i) the ability to search for suspicious communications across one or more channels and (ii) the ability to simply report false negatives. For example, the portal may permit false negatives to be reported to the threat detection platform with a single click. These core features result in notable benefits to users of the threat detection platform. The most notable benefit is the increased efficiency in investigation and remediation efforts. Another benefit is the improved visibility into digital activities performed with accounts associated with employees. With this improved visibility, the threat detection platform can also support improved control for browsing, searching, and filtering records as illustrated in FIGS. 10A-J.

Processing System

Figure 12:
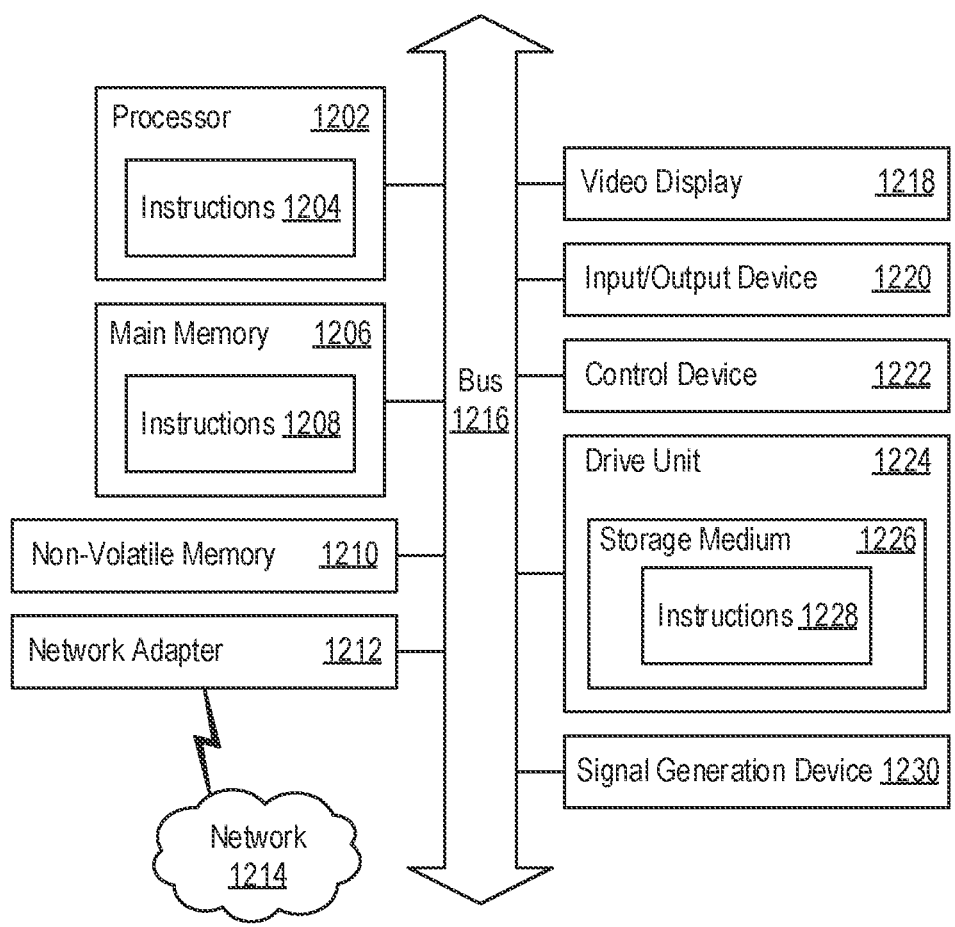
FIG. 12 is a block diagram illustrating an example of a processing system in which at least some operations described herein can be implemented.

FIG. 12 is a block diagram illustrating an example of a processing system 1200 in which at least some operations described herein can be implemented. For example, components of the processing system 1200 may be hosted on a computing device that includes a threat detection platform. As another example, components of the processing system 1200 may be hosted on a computing device that is queried by a threat detection platform to acquire emails, data, etc.

The processing system 1200 may include a central processing unit (also referred to as a "processor") 1202, main memory 1206, non-volatile memory 1210, network adapter 1212 (e.g., a network interface), video display 1218, input/output device 1220, control device 1222 (e.g., a keyboard or pointing device), drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an inter-integrated circuit ($I^2C$) bus, or an Institute of Electrical and Electronics Engineers (IEEE) standard 1394 bus (also referred to as "Firewire").

The processing system 1200 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1200.

While the main memory 1206, non-volatile memory 1210, and storage medium 1226 are shown to be a single medium, the terms "machine-readable medium" and "storage medium" should be taken to include a single medium or multiple media (e.g., a centralized/distributed database and/or associated caches and servers) that store one or more sets of instructions 1228. The terms "machine-readable medium" and "storage medium" shall also be taken to include any medium that is capable of storing, encoding, or carrying a set of instructions for execution by the processing system 1200.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in an electronic device. When read and executed by the processor 1202, the instruction(s) cause the processing system 1200 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 1210, removable disks, hard disk drives, and optical discs (e.g., compact disk read-only memory (CD-ROMs) and digital versatile disks (DVDs)), and transmission-type media, such as digital and analog communication links.

The network adapter 1212 enables the processing system 1200 to mediate data in a network 1214 with an entity that is external to the processing system 1200 through any communication protocol supported by the processing system 1200 and the external entity. The network adapter 1212 can include a network adapter card, a wireless network interface card, a router, an access point, a wireless router, a switch, a multilayer switch, a protocol converter, a gateway, a bridge, a bridge router, a hub, a digital media receiver, a repeater, or any combination thereof.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method, comprising:
   obtaining, by a threat detection platform, data that is related to a series of digital activities performed with accounts on a channel through which employees of an enterprise are able to communicate;
   parsing, by the threat detection platform, the data to discover an attribute of each digital activity;
   determining, by the threat detection platform, a threat posed by each digital activity based on the corresponding attribute;
   generating, by the threat detection platform, a record of each digital activity by populating a data structure with (i) the corresponding attribute and (ii) an indication of the threat posed to the enterprise, so as to generate a series of records;
   programmatically associating, by the threat detection platform, the series of records with the accounts by appending an identifier to each record that is representative of the corresponding account; and
   populating, by the threat detection platform, the series of records into digital profiles that are maintained for the accounts, so as to develop, for each account, a historical summary of all conduct on the channel that provides insight into behavior of each account on the channel over time.

2. The method of claim 1, wherein said determining comprises:
   for each digital activity,
      providing, as input, the corresponding attribute to a model that is trained to establish whether the digital activity is indicative of a threat based on past digital activities that were performed on the channel with the corresponding account.

3. The method of claim 1, wherein said determining comprises:
   for each digital activity,
      producing a metric that is indicative of the threat posed by the digital activity, and
      assigning a threat classification to the digital activity based on the metric.

4. The method of claim 1, wherein the series of digital activities includes receptions of communications, transmissions of communications, creations of mail filters, occurrences of sign-in events, or any combination thereof.

5. The method of claim 1, further comprising:
   receiving, by the threat detection platform, input, provided through a computer program, that is indicative of a query that specifies a criterion; and
   searching, by the threat detection platform, the digital profiles to identify at least one record that satisfies the query by having a given attribute that matches the criterion.

6. The method of claim 5, further comprising:
   causing, by the threat detection platform, display of an interface by the computer program that specifies the at least one record.

7. The method of claim 6, wherein the interface permits interaction so as to enable an individual to obtain more information regarding the at least one record.

8. A non-transitory medium with instructions stored thereon that, when executed by a processor of a computing device, cause the computing device to perform operations comprising:
   receiving input that is indicative of a query for records of digital activities that satisfy a criterion;
   accessing a datastore that includes digital profiles for accounts associated with employees of an enterprise,
   wherein each digital profile includes a series of records of digital activities that have been performed with a corresponding account on a channel through which the employees are able to communicate, and
   wherein each series of records is representative of a historical summary of conduct by the corresponding account that provides insight into whether behavior of the corresponding account changed over a given interval of time;
   searching the datastore to identify at least one record that satisfies the query; and
   causing display of an interface that includes information related to the at least one record.

9. The non-transitory medium of claim 8, wherein each record of the at least one record is determined to satisfy the query by having an attribute that matches the criterion.

10. The non-transitory medium of claim 8, wherein each record includes at least one of:
    (i) a unique identifier,
    (ii) a channel identifier,
    (iii) a reception date,
    (iv) a transmission date,
    (v) a source Internet Protocol (IP) address,
    (vi) a subject,
    (vii) a threat classification,
    (viii) a threat type, or
    (ix) a remediation status.

11. The non-transitory medium of claim 8,
    wherein each record specifies a threat type of which the corresponding digital activity is representative, and
    wherein the threat type is determined based on an output produced by a model to which one or more attributes of the corresponding digital activity are provided as input.

12. The non-transitory medium of claim 8, wherein the operations further comprise:
enabling an individual to obtain more information regarding threats to the enterprise by interacting with the at least one record through the interface.

13. The non-transitory medium of claim 8, wherein the operations further comprise:
enabling an individual to filter the at least one record by specifying a second criterion through the interface.

14. The non-transitory medium of claim 8, wherein the digital profiles are continually updated as digital activities are performed with the accounts, so as to reflect any changes in behavior of the accounts as evidenced through the digital activities that are performed on the channel.

15. The non-transitory medium of claim 8, wherein records are deleted from the digital profiles upon exceeding a certain age, such that each digital profile only includes records of digital activities occurring over a predetermined interval of time.

16. A method for managing a datastore in which digital profiles that are representative of historical models of behavior of accounts are stored, the method comprising:
establishing, via an application programming interface, a connection with a datastore that is associated with a given channel through which employees of an enterprise are able to communicate;
obtaining, in real time via the application programming interface, data associated with a communication transmitted on the given channel to an account that is associated with an employee;
generating a record of the communication by populating a data structure with multiple attributes of the communication; and
populating the record into a digital profile associated with the account,
wherein the digital profile is representative of a historical summary of all conduct on the given channel by the account over an interval of time.

17. The method of claim 16, further comprising:
determining whether the communication is representative of a threat by providing, as input, the multiple attributes to a model that is trained to produce an output that is representative of a threat classification.

18. The method of claim 16, wherein the multiple attributes include (i) a reception date, (ii) a transmission date, (iii) a subject of the communication, and (iv) another account from which the communication originates.

19. The method of claim 16, further comprising:
producing, based on the digital profile, a threat feed that includes information related to the record for export to a security product.

20. A system comprising:
a processor configured to:
obtain data that is related to a series of digital activities performed with accounts on a channel through which employees of an enterprise are able to communicate;
parse the data to discover an attribute of each digital activity;
determine a threat posed by each digital activity based on the corresponding attribute;
generate a record of each digital activity by populating a data structure with (i) the corresponding attribute and (ii) an indication of the threat posed to the enterprise, so as to generate a series of records;
associate the series of records with the accounts by appending an identifier to each record that is representative of the corresponding account; and
populate the series of records into digital profiles that are maintained for the accounts, so as to develop, for each account, a historical summary of all conduct on the channel that provides insight into behavior of each account on the channel over time; and
a memory coupled to the processor and configured to provide the processor with instructions.

21. The system of claim 20, wherein said determining comprises: for each digital activity, providing, as input, the corresponding attribute to a model that is trained to establish whether the digital activity is indicative of a threat based on past digital activities that were performed on the channel with the corresponding account.

22. The system of claim 20, wherein said determining comprises: for each digital activity, producing a metric that is indicative of the threat posed by the digital activity, and assigning a threat classification to the digital activity based on the metric.

23. The system of claim 20, wherein the series of digital activities includes receptions of communications, transmissions of communications, creations of mail filters, occurrences of sign-in events, or any combination thereof.

24. The system of claim 20, wherein the processor is further configured to:
receive input, provided through a computer program, that is indicative of a query that specifies a criterion; and
search the digital profiles to identify at least one record that satisfies the query by having a given attribute that matches the criterion.

25. The system of claim 24, wherein the processor is further configured to cause display of an interface by the computer program that specifies the at least one record.

26. The system of claim 25, wherein the interface permits interaction so as to enable an individual to obtain more information regarding the at least one record.

27. A system, comprising:
a processor configured to:
receive input that is indicative of a query for records of digital activities that satisfy a criterion;
access a datastore that includes digital profiles for accounts associated with employees of an enterprise, wherein each digital profile includes a series of records of digital activities that have been performed with a corresponding account on a channel through which the employees are able to communicate, and wherein each series of records is representative of a historical summary of conduct by the corresponding account that provides insight into whether behavior of the corresponding account changed over a given interval of time;
search the datastore to identify at least one record that satisfies the query; and
cause display of an interface that includes information related to the at least one record; and
a memory coupled to the processor and configured to provide the processor with instructions.

28. The system of claim 27, wherein each record of the at least one record is determined to satisfy the query by having an attribute that matches the criterion.

29. The system of claim 27, wherein each record includes at least one of:
(i) a unique identifier,
(ii) a channel identifier,
(iii) a reception date,
(iv) a transmission date,
(v) a source Internet Protocol (IP) address,
(vi) a subject, (vii) a threat classification,
(viii) a threat type, or
(ix) a remediation status.

30. The system of claim 27, wherein each record specifies a threat type of which the corresponding digital activity is representative, and wherein the threat type is determined based on an output produced by a model to which one or more attributes of the corresponding digital activity are provided as input.

31. The system of claim 27, wherein the processor is further configured to enable an individual to obtain more information regarding threats to the enterprise by interacting with the at least one record through the interface.

32. The system of claim 27, wherein the processor is further configured to enable an individual to filter the at least one record by specifying a second criterion through the interface.

33. The system of claim 27, wherein the digital profiles are continually updated as digital activities are performed with the accounts, so as to reflect any changes in behavior of the accounts as evidenced through the digital activities that are performed on the channel.

34. The system of claim 27, wherein records are deleted from the digital profiles upon exceeding a certain age, such that each digital profile only includes records of digital activities occurring over a predetermined interval of time.

35. A method, comprising:
receiving input that is indicative of a query for records of digital activities that satisfy a criterion;
accessing a datastore that includes digital profiles for accounts associated with employees of an enterprise, wherein each digital profile includes a series of records of digital activities that have been performed with a corresponding account on a channel through which the employees are able to communicate, and wherein each series of records is representative of a historical summary of conduct by the corresponding account that provides insight into whether behavior of the corresponding account changed over a given interval of time;
searching the datastore to identify at least one record that satisfies the query; and
causing display of an interface that includes information related to the at least one record.

36. The method of claim 35, wherein each record of the at least one record is determined to satisfy the query by having an attribute that matches the criterion.

37. The method of claim 35, wherein each record includes at least one of:
(i) a unique identifier,
(ii) a channel identifier,
(iii) a reception date,
(iv) a transmission date,
(v) a source Internet Protocol (IP) address,
(vi) a subject,
(vii) a threat classification,
(viii) a threat type, or
(ix) a remediation status.

38. The method of claim 35, wherein each record specifies a threat type of which the corresponding digital activity is representative, and wherein the threat type is determined based on an output produced by a model to which one or more attributes of the corresponding digital activity are provided as input.

39. The method of claim 35, further comprising enabling an individual to obtain more information regarding threats to the enterprise by interacting with the at least one record through the interface.

40. The method of claim 35, further comprising enabling an individual to filter the at least one record by specifying a second criterion through the interface.

41. The method of claim 35, wherein the digital profiles are continually updated as digital activities are performed with the accounts, so as to reflect any changes in behavior of the accounts as evidenced through the digital activities that are performed on the channel.

42. The method of claim 35, wherein records are deleted from the digital profiles upon exceeding a certain age, such that each digital profile only includes records of digital activities occurring over a predetermined interval of time.

43. A system, comprising:
a processor configured to:
establish, via an application programming interface, a connection with a datastore that is associated with a given channel through which employees of an enterprise are able to communicate;
obtain, in real time via the application programming interface, data associated with a communication transmitted on the given channel to an account that is associated with an employee;
generate a record of the communication by populating a data structure with multiple attributes of the communication; and
populate the record into a digital profile associated with the account, wherein the digital profile is representative of a historical summary of all conduct on the given channel by the account over an interval of time; and
a memory coupled to the processor and configured to provide the processor with instructions.

44. The system of claim 43, wherein the processor is further configured to determine whether the communication is representative of a threat by providing, as input, the multiple attributes to a model that is trained to produce an output that is representative of a threat classification.

45. The system of claim 43, wherein the multiple attributes include (i) a reception date, (ii) a transmission date, (iii) a subject of the communication, and (iv) another account from which the communication originates.

46. The system of claim 43, wherein the processor is further configured to produce, based on the digital profile, a threat feed that includes information related to the record for export to a security product.

* * * * *